(12) United States Patent
Onodera et al.

(10) Patent No.: US 12,533,102 B2
(45) Date of Patent: Jan. 27, 2026

(54) X-RAY IMAGING APPARATUS

(71) Applicant: Shimadzu Corporation, Kyoto (JP)

(72) Inventors: Hiroki Onodera, Kyoto (JP); Koki Yoshida, Kyoto (JP); Dai Hirose, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 173 days.

(21) Appl. No.: 18/531,111

(22) Filed: Dec. 6, 2023

(65) Prior Publication Data

US 2024/0237964 A1    Jul. 18, 2024

(30) Foreign Application Priority Data

Jan. 12, 2023  (JP) ................................. 2023-003315
Sep. 29, 2023  (JP) ................................. 2023-170930

(51) Int. Cl.
*A61B 6/00* (2024.01)
*A61B 6/10* (2006.01)
*G16H 40/63* (2018.01)
*A61B 6/04* (2006.01)

(52) U.S. Cl.
CPC .............. *A61B 6/547* (2013.01); *A61B 6/102* (2013.01); *A61B 6/545* (2013.01); *G16H 40/63* (2018.01); *A61B 6/0407* (2013.01); *A61B 6/4441* (2013.01)

(58) Field of Classification Search
None
See application file for complete search history.

(56) References Cited

U.S. PATENT DOCUMENTS

2020/0305832 A1* 10/2020 Gemmel ................ A61B 6/547
2022/0225953 A1    7/2022 Onodera et al.

FOREIGN PATENT DOCUMENTS

JP    2022-110713 A    7/2022

* cited by examiner

*Primary Examiner* — Hoon K Song
(74) *Attorney, Agent, or Firm* — Muir Patent Law, PLLC

(57) ABSTRACT

An Xray imaging apparatus is provided with an X-ray source, an X-ray detector, an arm, an arm driving mechanism, an X-ray detector moving mechanism, a model acquisition unit for acquiring a subject model of a surface shape of the subject, and a controller configured to select a target position where a distance of the X-ray detector to a surface of the subject model is shorter, out of a first target position set based on a position of the subject model and a preset second target position and perform a control to move the X-ray detector toward the selected target position.

13 Claims, 23 Drawing Sheets

FIG.2
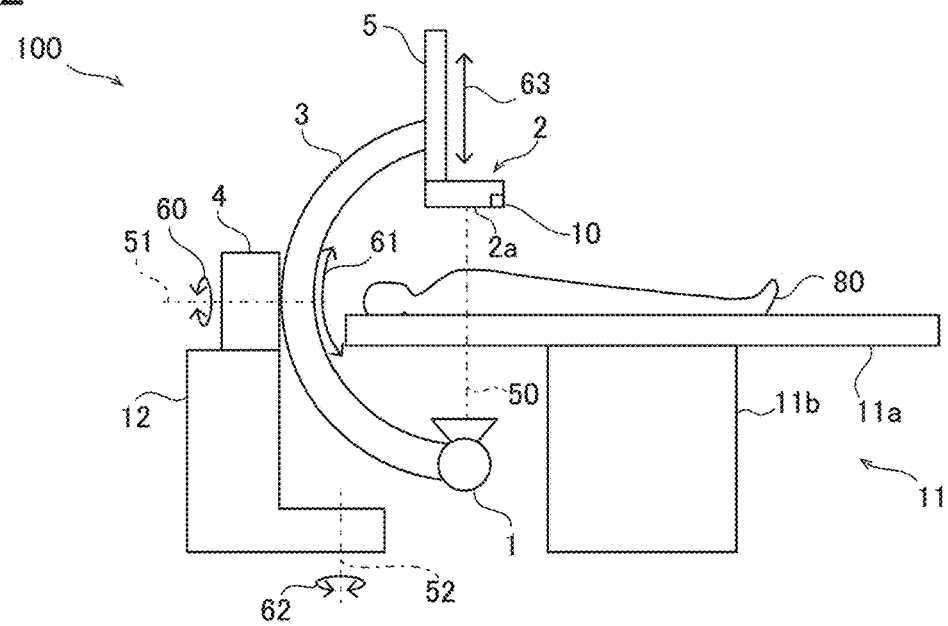
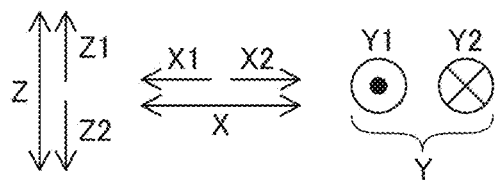
FIG.3
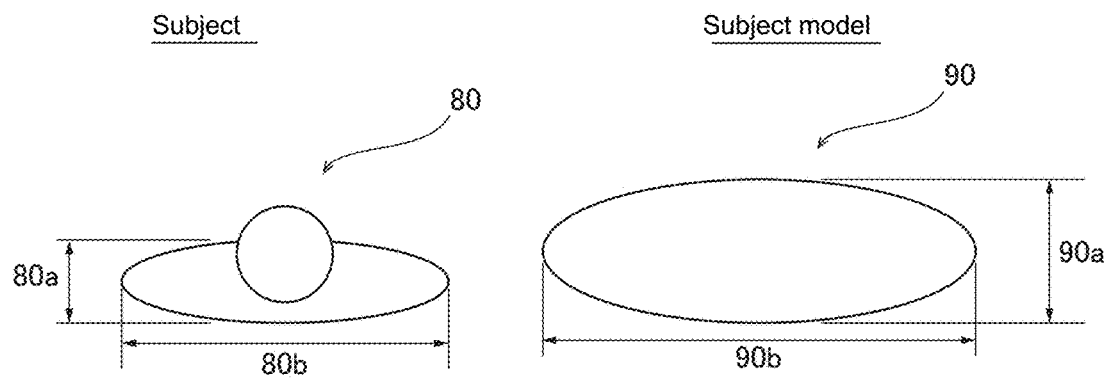
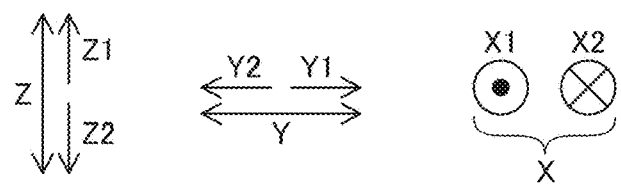

First target position

Second target position

First modification

First modification

First modification

Third target position

First modification

Fourth target position

Second modification

Second modification

Third modification

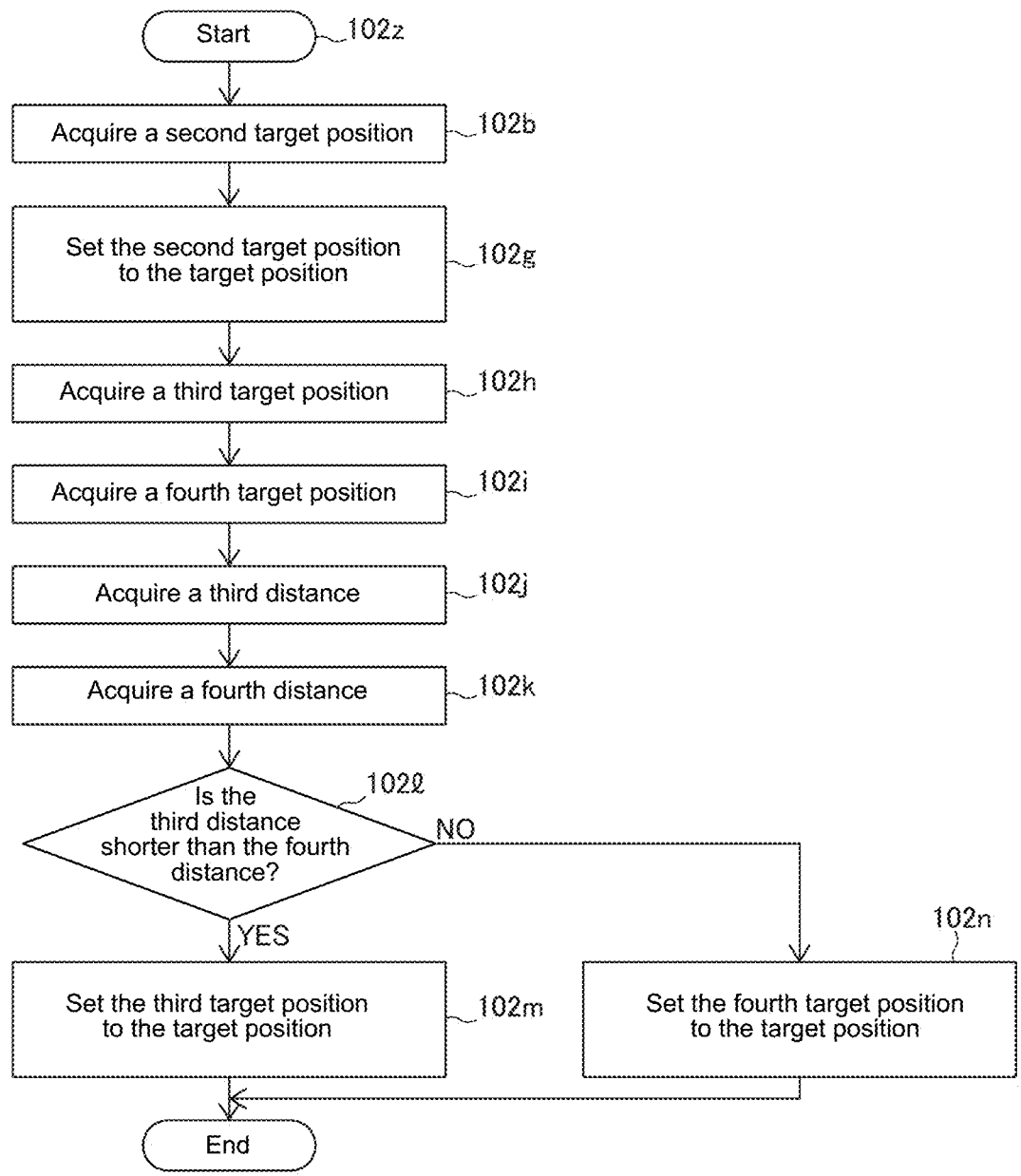

X-RAY IMAGING APPARATUS

CROSS-REFERENCE TO RELATED APPLICATIONS

The related Japanese Patent Application No. 2023-003315, entitled "X-ray imaging apparatus," filed on Jan. 12, 2023, invented by ONODERA Hiroki, YOSHIDA Koki, HIROSE Dai, and the related Japanese Patent Application No. 2023-170930, entitled "X-ray imaging apparatus," filed on Sep. 29, 2023, invented by ONODERA Hiroki, YOSHIDA Koki, HIROSE Dai, upon which this patent application is based, are each hereby incorporated by reference in its entirety.

BACKGROUND OF THE INVENTION

Field of the Invention

The present invention relates to an X-ray imaging apparatus, more particularly to an X-ray imaging apparatus equipped with an arm for holding an X-ray source and an X-ray detector.

Description of the Related Art

The following description sets forth the inventor's knowledge of the related art and problems therein and should not be construed as an admission of knowledge in the prior art.

Conventionally, an X-ray imaging apparatus equipped with an arm for holding an X-ray source and an X-ray detector is known. Such an X-ray imaging apparatus is disclosed in, for example, Japanese Unexamined Patent Application Publication No. 2022-110713.

The X-ray imaging apparatus disclosed in Japanese Unexamined Patent Application Publication No. 2022-110713 described above is equipped with an X-ray source, an X-ray detector, an arm for holding the X-ray source and the X-ray detector, an arm driving mechanism for driving the arm, an X-ray detector moving mechanism for moving the X-ray detector in the X-ray irradiation axis direction, and a controller. The above-described Japanese Unexamined Patent Application Publication No. 2022-110713 discloses a configuration in which a controller controls an X-ray detector moving mechanism to move the X-ray detector closer to or further away from the surface of a subject model, which is a model of the surface shape of the subject.

Here, when the distance between the subject and the X-ray detector becomes too large, the distance from the X-ray source to the X-ray detector becomes larger than a predetermined distance, which increases the X-ray attenuation. As the X-ray attenuation increases, the contrast of the resulting image decreases. In this case, in order to suppress the decrease in the contrast of the resulting image, it is conceivable to increase the X-ray irradiation dose. Increasing the X-ray irradiation dose has the disadvantage of increasing scattered X-rays and degrading the image quality of the resulting image. Therefore, the X-ray imaging apparatus disclosed in the above-described Unexamined Patent Application Publication No. 2022-110713 is configured to move the X-ray detector so as to bring it closer to the surface of the subject model so that the distance between the subject and the X-ray detector becomes not large.

However, in the configuration disclosed in Japanese Unexamined Patent Application Publication No. 2022-110713, the control to move the X-ray detector with respect to the subject model is performed. Therefore, in the case where the difference between the thickness and the width of the subject model and the body thickness and the body width of the subject is large, the distance between the X-ray detector and the subject may sometimes become too large. In other words, as a result of diligent study, the inventors of the present application found that the position of the X-ray detector after the movement may sometimes become too far from the subject in the case of the configuration in which the X-ray detector is moved closer to the subject based only on the subject model.

In the case where the position of the X-ray detector after the movement is too far from the subject, it may be conceivable that the operator manually moves the X-ray detector further to thereby reduce the distance between the subject and the X-ray detector. However, the operator is required manually move the X-ray detector each time the imaging position is changed, and therefore, there is an inconvenience of increasing the operator's workload. Therefore, there is a need for an X-ray imaging apparatus capable of suppressing the increase in the operator's workload while suppressing the increase in the distance between the subject and the X-ray detector.

SUMMARY OF THE INVENTION

The present invention has been made to solve the above-described problems. One object of the present invention is to provide an X-ray imaging apparatus capable of suppressing the increase in the operator's workload while suppressing the increase in the distance between the subject and the X-ray detector.

In order to attain the above-described object, an X-ray imaging apparatus according to one aspect of the present invention includes:

an X-ray source configured to irradiate a subject with X-rays;

an X-ray detector configured to detect X-rays emitted from the X-ray source;

an arm configured to hold the X-ray source and the X-ray detector;

an arm driving mechanism configured to drive the arm;

an X-ray detector moving mechanism provided on the arm to move the X-ray detector forward or backward in an X-ray irradiation axis direction;

a model acquisition unit configured to acquire a subject model, the subsect model being a model of a surface shape of the subject; and a controller configured to perform a control to move the X-ray detector toward a selected target position by selecting a target position where a distance of the X-ray detector to a surface of the subject model is shorter, out of a first target position and a second target position, the first target position being a target position of the X-ray detector set based on a position of the subject model, the second target position being a preset target position of the X-ray detector, and controlling the X-ray detector moving mechanism.

As a result of the inventors' diligent study, they found that in a case where the accuracy of the thickness and the width of the subject model is low, the X-ray detector can be sometimes placed at a position closer to the subject in the case of the preset target position (second target position). Furthermore, in a case where the accuracy of the thickness and the width of the subject model is high, the X-ray detector can be sometimes placed closer to the subject than the second target position in the case of the target position (first target position) set based on the position of the subject model. In other words, the inventors of the present application have found that the X-ray detector can be placed closer to the subject based on the first target position based on the subject model and the preset second target position.

For this reason, in the X-ray imaging apparatus according to one aspect of the present invention, it is provided with a controller configured to select a target position where a distance of the X-ray detector to a surface of the subject model is shorter, out of a first target position which is a target position of the X-ray detector set based on a position of the subject model and a second target position which is a preset target position of the X-ray detector and move the X-ray detector moving mechanism to perform a control to move the X-ray detector toward the selected target position.

With this configuration, the X-ray detector is moved to a target position closer to the surface of the subject model out of the first target position based on the subject model and the preset second target position. Therefore, as compared with the configuration in which the X-ray detector is moved based only on the subject model, it is possible to suppress the X-ray detector from becoming too far away from the subject. Therefore, it becomes possible to suppress the operator from further moving the X-ray detector after the movement of the X-ray detector by the X-ray detector moving mechanism, thereby suppressing the increase in the operator's workload.

Furthermore, in the case where the accuracy of the subject model is high, the X-ray detector is moved toward the first target position. Since the accuracy of the subject model is high, there is no need for the operator to further move the X-ray detector after moving it to the first target position, and therefore, it is possible to suppress the increase in the operator's workload. As a result, it is possible to suppress the increase in the operator's workload while suppressing the increase in the distance between the subject and the X-ray detector.

BRIEF DESCRIPTION OF THE DRAWINGS

Some preferred embodiments of the present invention will be shown by way of example, and not limitation, in the accompanying figures.

FIG. 2 is a schematic diagram showing a configuration of an X-ray imaging apparatus according to one embodiment.

FIG. 3 is a schematic diagram for explaining a subject model that an X-ray imaging apparatus according to one embodiment generates.

FIG. 28 is a second flowchart for explaining the processing in which an X-ray imaging apparatus sets a target position of an X-ray detector according to the third modification.

DETAILED DESCRIPTION OF THE PREFERRED EMBODIMENTS

In the following paragraphs, some preferred embodiments of the present invention will be described by way of example and not limitation. It should be understood based on this disclosure that various other modifications can be made by those skilled in the art based on these illustrated embodiments.

Hereinafter, some embodiments in which the present invention is embodied will be described based on the attached drawings.

Referring to FIG. 1 to FIG. 7, an X-ray imaging apparatus 100 according to one embodiment of the present invention will be described.

(Overall Configuration of X-Ray Imaging Apparatus)

First, referring to FIG. 1, the configuration of the X-ray imaging apparatus 100 according to one embodiment of the present invention will be described.

Figure 1:
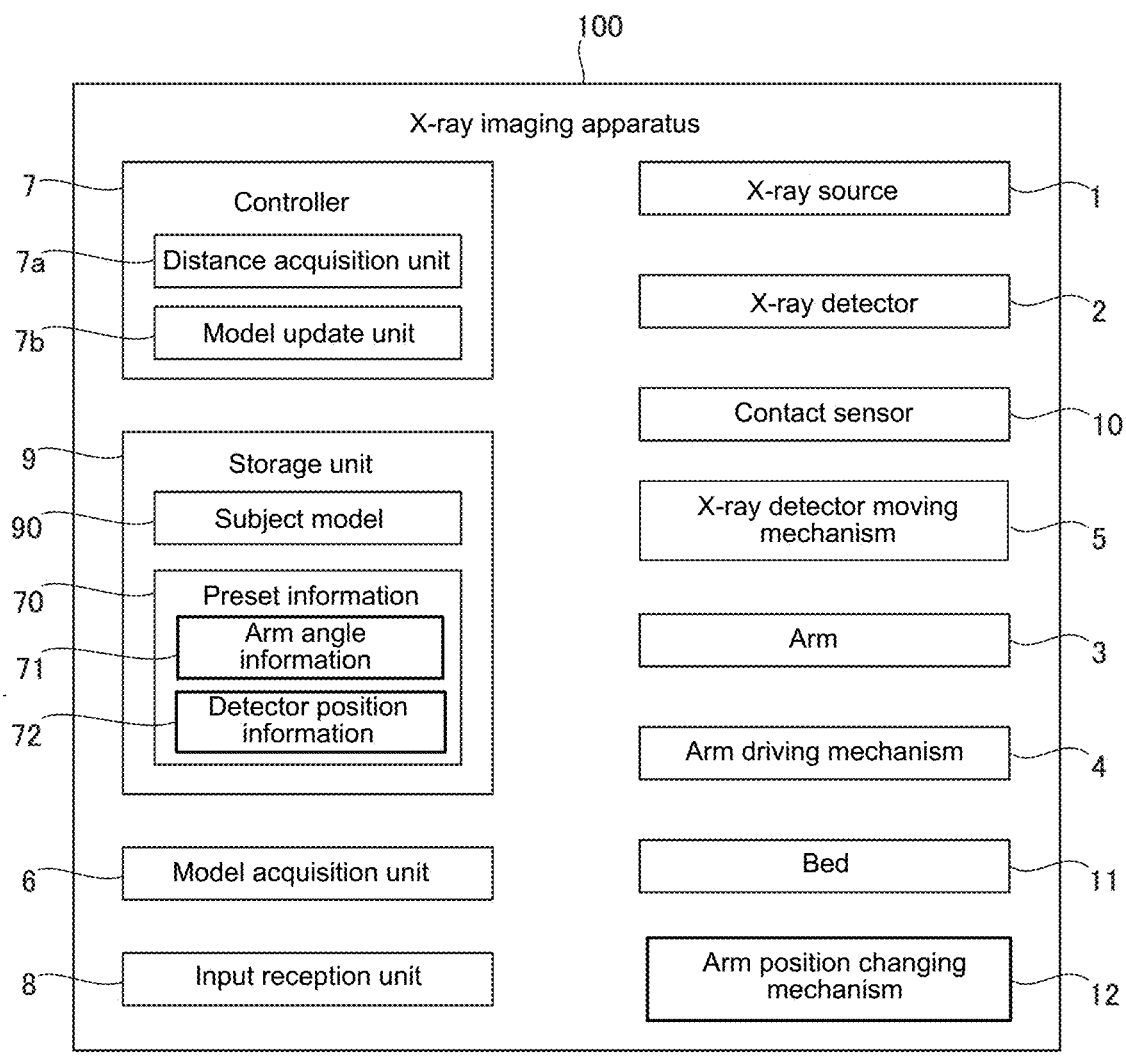
FIG. 1 is a block diagram showing an entire configuration of an X-ray imaging apparatus according to one embodiment.

As shown in FIG. 1, the X-ray imaging apparatus 100 is equipped with an X-ray source 1, an X-ray detector 2, an arm 3, an arm driving mechanism 4, an X-ray detector moving mechanism 5, a model acquisition unit 6, and a controller 7. In this embodiment, the X-ray imaging apparatus 100 is equipped with an input reception unit 8, a storage unit 9, a contact sensor 10, and a bed 11. Further, in this embodiment, the X-ray imaging apparatus 100 is equipped with an arm position changing mechanism 12.

Next, referring to FIG. 2, the details of the configuration of the X-ray imaging apparatus 100 will be described. As shown in FIG. 2, the X-ray imaging apparatus 100 is installed, for example, in an examination room to perform a treatment and a diagnosis of a region of interest of the subject 80 by administering a contrast agent to the subject 80 and imaging the subject 80. Further, the X-ray imaging apparatus 100 is configured to be able to image the region of interest of the subject 80 from a plurality of angles.

Note that in the example shown in FIG. 2, the vertical direction is defined as a Z-direction, the upward direction is defined as a Z1-direction, and the downward direction is defined as a Z2-direction. Further, the two directions perpendicular to each other in the horizontal plane perpendicular to the Z-direction are defined as an X-direction and a Y-direction. Of the X-directions, one side direction is defined as an X1-direction, and the other side direction is defined as an X2-direction. Of the Y-directions, one side direction is defined as a Y1-direction, and the other side direction is defined as a Y2-direction. Note that the X-direction is the longitudinal direction of the top board 11a. In other words, the X-direction is the head-foot (body length) direction of the subject 80. Further, the Y-direction is the short direction of the top board 11a. In other words, the Y-direction is the body width 80b (see FIG. 3) direction of the subject 80.

As shown in FIG. 2, the X-ray source 1 is configured to emit X-rays. The X-ray source 1 is configured to generate X-rays when a high voltage is applied and emit the generated X-rays in the direction of the irradiation axis 50. In this embodiment, the X-ray source 1 is held so as to face the X-ray detector 2 on one side of the arm 3. Thus, in this embodiment, the X-rays emitted from the X-ray source 1 are directed to the X-ray detector 2. Further, in this embodiment, the arm 3 is positioned so that the top board 11a is placed between the X-ray source 1 and the X-ray detector 2. Therefore, the X-ray source 1 is configured to emit the X-rays to the subject 80.

The X-ray detector 2 is configured to detect X-rays. Further, the X-ray detector 2 is configured to convert the detected X-rays into electric signals and read the converted electric signals as image signals. In this embodiment, the X-ray detector 2 is held so as to face the X-ray source 1 on the other side of the arm 3. Therefore, the X-ray detector 2 is configured to detect X-rays emitted from the X-ray source 1. The X-ray detector 2 is, for example, an FPD (Flat Panel Detector).

The arm 3 is configured to hold the X-ray source 1 and the X-ray detector 2. In this embodiment, the arm 3 has an arc shape and holds the X-ray source 1 at one end and the X-ray detector 2 at the other end. The arm 3 is a so-called C-arm. Further, the arm 3 is held rotatably by the arm driving mechanism 4. Specifically, the arm 3 is held by the arm driving mechanism 4 in a rotatable manner around the rotation axis 51, as shown by the arrow 60. FIG. 2 shows an example in which the arm 3 is placed so that the top board 11a is positioned between the X-ray source 1 and the X-ray detector 2.

The arm driving mechanism 4 is configured to drive the arm 3. The arm driving mechanism 4 includes, for example, a motor. The arm driving mechanism 4 is held by the arm position changing mechanism 12 for moving the arm 3 and the arm driving mechanism 4. In this embodiment, the arm driving mechanism 4 holds the arm 3 in a rotatable manner around the rotation axis 51 as shown by the arrow 60. Further, the arm driving mechanism 4 is configured to move the arm 3 in the circumferential direction of the arm 3 (in the arrow direction 61). In this embodiment, the arm driving mechanism 4 is configured to change the position and the angle of the arm 3 with respect to the bed 11. FIG. 2 shows an example in which the arm driving mechanism 4 is placed so that the rotation axis 51 extends in the horizontal direction (X-direction).

The X-ray detector moving mechanism 5 is provided on the arm 3 and is configured to move the X-ray detector 2 forward or backward in the direction of the X-ray irradiation axis 50. Specifically, the X-ray detector moving mechanism 5 is configured to move the X-ray detector 2 in the direction of the X-ray irradiation axis 50, as shown by the arrow 63. FIG. 2 shows a state in which the X-ray irradiation axis 50 extends in the Z-direction, so the X-ray detector moving mechanism 5 moves the X-ray detector 2 in the Z-direction. The X-ray detector moving mechanism 5 includes, for example, a linear motion mechanism.

The contact sensor 10 is provided on the X-ray detector moving mechanism 5 and is configured to detect whether the X-ray detector 2 has comes into contact with the subject 80. As shown in FIG. 2, the contact sensor 10 is attached to the surface 2a of the X-ray detector 2 facing the X-ray source 1. The contact sensor 10 is configured to detect whether the X-ray detector 2 has come into contact with the subject 80 when the X-ray detector 2 is moved by the X-ray detector moving mechanism 5. The contact sensor 10 includes, for example, a mechanical sensor.

The bed 11 is configured to place the subject 80 thereon. The bed 11 includes a top board 11a and a top board moving mechanism 11b. The subject 80 is placed on the top board 11a.

The top board moving mechanism 11b is configured to move the top board 11a in the Z-direction. Further, the top board moving mechanism 11b is configured to move the top board 11a in parallel to the XY plane. Further, the top board moving mechanism 11b is configured to allow the top board 11a to be tilted in the X-direction and in the Y-direction. The top board moving mechanism 11b includes, for example, a linear motion mechanism for moving the top board 11a in the X-direction, a linear motion mechanism for moving the top board 11a in the Y-direction, and a linear motion mechanism for moving the top board 11a in the Z-direction.

The arm position changing mechanism 12 is configured to move the arm driving mechanism 4 to move the arm 3 to a desired imaging position together with the arm driving mechanism 4. The arm position changing mechanism 12 is configured to be rotatable around the rotation axis 52, as shown by the arrow 62. The arm position changing mechanism 12 is configured to move the arm 3 to a desired imaging position together with the arm driving mechanism 4 by rotating around the rotation axis 52. FIG. 2 shows an example in which the arm position changing mechanism 12 is installed on the floor of the examination room. Therefore, the rotation axis 52 extends vertically (in the Z-direction). The arm position changing mechanism 12 includes a drive source, a drive force transmitting member for transmitting a driving force from the drive source, and a rotating unit that is rotated by the driving force transmitted from the drive source.

Next, referring to FIG. 1 and FIG. 2, the control of the X-ray imaging apparatus 100 will be described.

The model acquisition unit 6 is configured to acquire a subject model 90, which is a model of the surface shape of the subject 80. The model acquisition unit 6 is configured to acquire, for example, a subject model 90 that has been generated in advance and stored in a hospital system server (not shown) or an electronic medical record system (not shown) of a hospital where the X-ray imaging apparatus 100 is installed. The model acquisition unit 6 includes, for example, an input/output interface.

The controller 7 is configured to control the X-ray imaging apparatus 100. Further, the controller 7 is configured to control the arm driving mechanism 4 and the arm position changing mechanism 12 to place the arm 3 at a predetermined imaging position for imaging. Further, the controller 7 is configured to control the arm driving mechanism 4 and the arm position changing mechanism 12 based on the operation input by the operator via the input reception unit 8 to move the arm 3.

Further, the controller 7 is configured to control the X-ray detector moving mechanism 5 to perform a control to move the X-ray detector 2. Further, the controller 7 is configured to control the X-ray detector moving mechanism 5 based on the operation input input by the operator by means of the input reception unit 8 to move the X-ray detector 2. The controller 7 includes, for example, a processor, such as, e.g., a central processing unit (CPU), and a circuitry. The details of the configuration in which the controller 7 places the arm 3 at a predetermined imaging position and moves the X-ray detector 2 will be described below.

Figure 4:
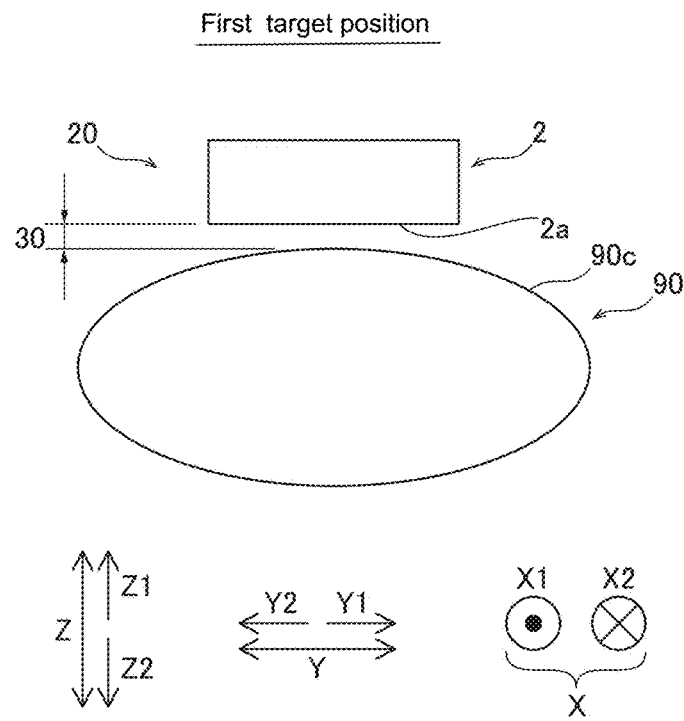
FIG. 4 is a schematic diagram for explaining a first target position according to one embodiment.
Figure 5:
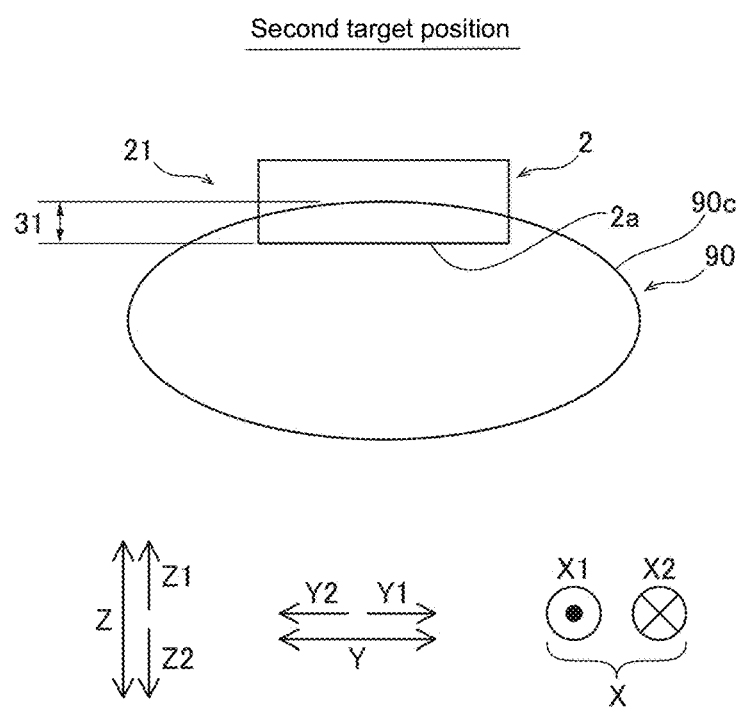
FIG. 5 is a schematic diagram for explaining a second target position according to one embodiment.

Further, in this embodiment, the controller 7 is configured to select a target position in which the distance of the X-ray detector 2 to the surface 90c (see FIG. 4) of the subject model 90 is shorter, out of a first target position 20 (see FIG. 4) and a second target position 21 (see FIG. 5). Further, the controller 7 is configured to control the X-ray detector moving mechanism 5 to perform the control to move the X-ray detector 2 toward the selected target position.

The first target position 20 is a target position of the X-ray detector 2 set based on the position of the subject model 90. Further, the second target position 21 is a preset target position of the X-ray detector 2.

Further, the controller 7 includes a distance acquisition unit 7a and a model update unit 7b. The distance acquisition unit 7a and the model update unit 7b are configured by software as functional blocks realized by the controller 7 executing various programs stored in the storage unit 9. The distance acquisition unit 7a and the model update unit 7b may be configured by mutually separate hardware by providing dedicated processors (processing units).

The distance acquisition unit 7a is configured to acquire a first distance 30 (see FIG. 4) which is a distance between the first target position 20 and the surface 90c of the subject model 90, and a second distance 31 (see FIG. 5) which is a distance between the second target position 21 and the surface 90c of the subject model 90. The details of the configuration in which the distance acquisition unit 7a acquires a first distance 30 and a second distance 31 will be described below.

The model update unit 7b is configured to update the subject model 90 stored in the storage unit 9. The details of the configuration in which the model update unit 7b updates the subject model 90 will be described below.

The input reception unit 8 is configured to receive an operational input from the operator. The input reception unit 8 includes an input device, such as, e.g., a mouse, a keyboard, and a joystick.

The storage unit 9 is configured to store the subject model 90. Further, the storage unit 9 is configured to store a plurality of pieces of preset information 70. The storage unit 9 includes a non-volatile storage device, such as, e.g., a Hard Disk Drive (HDD) and an SSD (Solid State Drive).

The plurality of pieces of preset information 70 includes arm angle information 71 and detector position information 72. The arm angle information 71 is information about the angle of the arm 3 at the target position. Further, the detector position information 72 is information on the position of the X-ray detector 2 in the direction of the X-ray irradiation axis 50. The plurality of pieces of preset information 70 may include a plurality of pieces of arm angle information 71 and a plurality of pieces of detector position information 72 for a single imaging site. Further, the plurality of pieces of preset information 70 may include the arm angle information 71 and the detector position information 72 for a plurality of imaging sites. Further, the preset information 70 includes the arm angle information 71 and the detector position information 72 of the preset values.

Further, in a clinical site, in cases where no emergency is required, before the operator images the subject 80, the arm angle information 71 and the detector position information 72 when the X-ray detector 2 is brought close to the subject 80 in advance can be stored in the storage unit 9 as the preset information 70. Further, the preset information 70 including the arm angle information 71 and the detector position information 72 of preset values can be updated by the arm angle information 71 and the detector position information 72 when the operator has moved the X-ray detector 2 closer to the subject 80. In other words, as the preset information 70, the arm angle information 71 and the detector position information 72 acquired based on the physique of the subject 80 can be stored in the storage unit 9.

In other words, the controller 7 performs a control to image the subject 80 at the imaging position where the arm 3 and the X-ray detector 2 have been moved according to the preset information 70 selected by the operator. In the case where the operator has selected a plurality of pieces of preset information 70, the subject 80 is imaged at a plurality of imaging positions where the arm 3 and the X-ray detector 2 have been moved for the selected preset information 70.

(Subject Model)

Next, referring to FIG. 3, the subject model 90 will be described. The subject model 90 is a three-dimensional model of the surface shape of the subject 80. As shown in FIG. 3, the subject model 90 has an oval shape with a thickness 90a as the minor side and a width 90b as the major side. Note that the subject model 90 is generated based on information on, e.g., the height and the weight of the subject 80, and is stored in a hospital system server (not shown) or an electronic medical record system (not shown) in a hospital where the X-ray imaging apparatus 100 is installed.

The subject model 90 has a shape larger than the subject 80. In other words, the thickness 90a of the subject model 90 is greater than the body thickness 80a of the subject 80. Further, the width 90b of the subject model 90 is larger than the body width 80b of the subject 80. Further, in FIG. 3, the subject model 90 is illustrated in a two-dimensional shape for convenience, but in reality, it is an elliptical column extending in the direction of the head-foot direction of the subject 80.

In this embodiment, the subject model 90 is acquired by the model acquisition unit 6 (see FIG. 1) and stored in the storage unit 9 (see FIG. 1).

(First Target Position and Second Target Position)

In this embodiment, the controller 7 is configured to perform both the control to move the X-ray detector 2 based on the first target position 20 (see FIG. 4) and the control to move the X-ray detector 2 based on the second target position 21 (see FIG. 5).

The control to move the X-ray detector 2 based on the first target position 20 is a control in which the controller 7 moves the X-ray detector 2 closer to the subject model 90.

Further, the control to move the X-ray detector 2 based on the second target position 21 is a control in which the controller 7 moves the X-ray detector 2 based on the arm angle information 71 (see FIG. 1) and the detector position information 72 (see FIG. 1) included in the preset information 70 (see FIG. 1), without using the subject model 90.

Here, as the distance between the X-ray source 1 (see FIG. 2) and the X-ray detector 2 (see FIG. 2) increases, the amount of X-ray attenuation in the space between the X-ray source 1 and the X-ray detector 2 increases. Therefore, when performing imaging, as the X-ray detector 2 is moved closer to the subject 80, the X-ray attenuation of X-rays can be reduced.

Therefore, in this embodiment, when imaging the subject 80, the controller 7 perform the control to bring the X-ray detector 2 closer to the surface of the subject 80 in order to bring the X-ray detector 2 closer to the X-ray source 1 at each imaging position. Specifically, in this embodiment, the controller 7 is configured to compare the first target position 20 and the second target position 21 and perform a control to move the X-ray detector 2 to the target position where the X-ray detector 2 is brought closer to the subject 80.

Note that in this embodiment, the controller 7 is configured to compare the first target position 20 and the second target position 21 set based on the operation input by the operator. When any one of the plurality of pieces of preset information 70 (see FIG. 1) is selected based on the operation input by the operator input by the input reception unit 8 (see FIG. 1), the controller 7 is configured to acquire the first target position 20 in the arm angle information 71 (see FIG. 1) of the selected preset information 70. Further, the controller 7 is configured to acquire, as the second target position 21, the detector position information 72 included in the selected preset information 70.

Note that in the case where the preset information 70 has been updated, the controller 7 acquires the second target position 21 based on the updated preset information 70. Further, the controller 7 is configured to compare the acquired first target position 20 and the acquired second target position 21.

The first target position 20 shown in FIG. 4 is a target position of the X-ray detector 2 set based on the position of the subject model 90. Specifically, the first target position 20 includes a position where the surface 2a of the X-ray detector 2 facing the subject 80 (see FIG. 2) contacts the surface 90c of the subject model 90, and a position where the X-ray detector 2 and the subject model 90 are separated from each other and the distance (first distance 30) between the surface 2a of the X-ray detector 2 and the surface 90c of the subject model 90 is less than a predetermined distance.

The second target position 21 shown in FIG. 5 is a preset position of the X-ray detector 2. Specifically, it is the position of the X-ray detector 2 set by the arm angle information 71 (see FIG. 1) and the detector position information 72 (see FIG. 1) included in the preset information 70 (see FIG. 1) selected by the operator.

Note that the second target position 21 is a position set regardless of the subject model 90. Therefore, when moving the X-ray detector 2 to the second target position 21, there can be a state in which the X-ray detector 2 is placed inside the subject model 90, a state in which the X-ray detector 2 is placed at a position where it contacts the surface 90c of the subject model 90, and a state in which the X-ray detector 2 is placed outside the subject model 90. FIG. 5 shows the case in which the X-ray detector 2 is placed inside the subject model 90. In other words, the surface 2a of the X-ray detector 2 is positioned closer to the center of the subject model 90 than the surface 90c of the subject model 90.

In this embodiment, the controller 7 compares the first distance 30 (see FIG. 4) and the second distance 31 (see FIG. 5) acquired by the distance acquisition unit 7a. The controller 7 is configured to control the X-ray detector moving mechanism 5 to move the X-ray detector 2 toward the first target position 20 when the first distance 30 is shorter than the second distance 31. The controller 7 is configured to control the X-ray detector moving mechanism 5 to move the X-ray detector 2 toward the second target position 21 when the second distance 31 is shorter than the first distance 30.

Note that as shown in FIG. 5, when the surface 2a of the X-ray detector 2 is positioned on the inner side of the surface 90c of the subject model 90, the controller 7 controls the X-ray detector moving mechanism 5 to move the X-ray detector 2 toward the second target position 21 even in the case where the second distance 31 is larger than the first distance 30. That is, the controller 7 treats the second distance 31 as negative in the case where the surface 2a of the X-ray detector 2 is positioned inner than the surface 90c of the subject model 90. Further, in the case where the second distance 31 is negative, the controller 7 is configured to determine that the second distance 31 is shorter than the first distance 30, regardless of the absolute values of the first distance 30 and the second distance 31.

The distance acquisition unit 7a (see FIG. 1) acquires, as the first distance 30, the distance between the surface 2a of the X-ray detector 2 at the first target position 20 and the surface 90c of the subject model 90. Further, the distance acquisition unit 7a acquires, as the second distance 31, the distance between the surface 2a of the X-ray detector 2 at the second target position 21 and the surface 90c of the subject model 90.

(Imaging Position)

Here, in this embodiment, the plurality of pieces of preset information 70 (see FIG. 1) stored in the storage unit 9 (see FIG. 1) may include preset information 70 for imaging from a plurality of angles for a single imaging site. In other words, in this embodiment, the X-ray imaging apparatus 100 (see FIG. 2) is configured to be capable of performing imaging by changing the position and the angle of the arm 3 (see FIG. 2) when imaging an imaging site of the subject 80 (see FIG. 2).

In this embodiment, the controller 7 is configured to automatically perform the control to change the arm 3 to change the position and the angle of the arm 3 based on the arm angle information 71 (see FIG. 1) and the detector position information 72 (see FIG. 1) included in the preset information 70 selected by the operator. For example, the X-ray imaging apparatus 100 changes the position and the angle of the arm 3 from the first imaging position shown in FIG. 6 to the second imaging position shown in FIG. 7.

Figure 6:
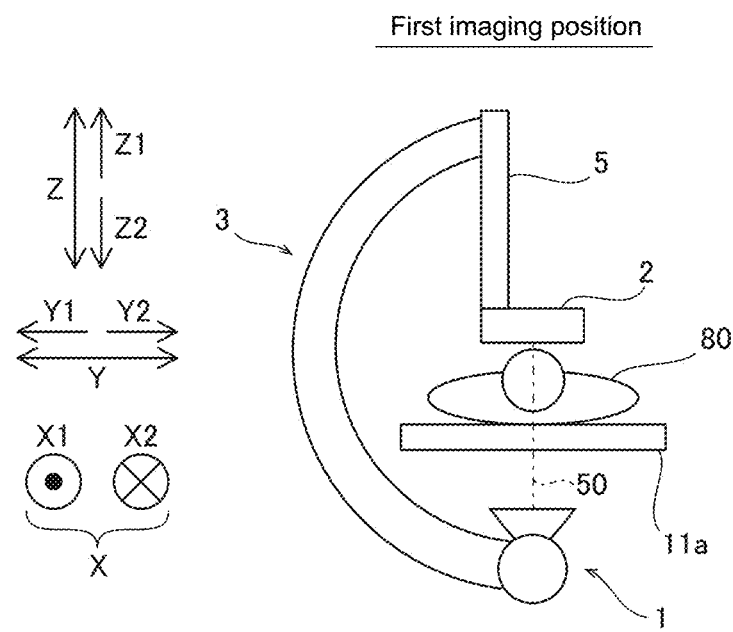
FIG. 6 is a schematic diagram for explaining a first imaging position according to one embodiment.

The first imaging position is an imaging position where imaging is performed first out of a plurality of imaging positions selected by the operator. FIG. 6 shows an example is shown in which the position where the X-ray source 1 and the X-ray detector 2 are arranged so that the irradiation axis 50 extends along the Z-direction is selected as the first imaging position. In other words, FIG. 6 shows a case in which the imaging position for imaging the subject 80 from the direction along the body thickness 80*a* (see FIG. 3) is stored in the storage unit 9 (see FIG. 1) as the preset information 70 (see FIG. 1), and the operator selects it as the first imaging position.

Figure 7:
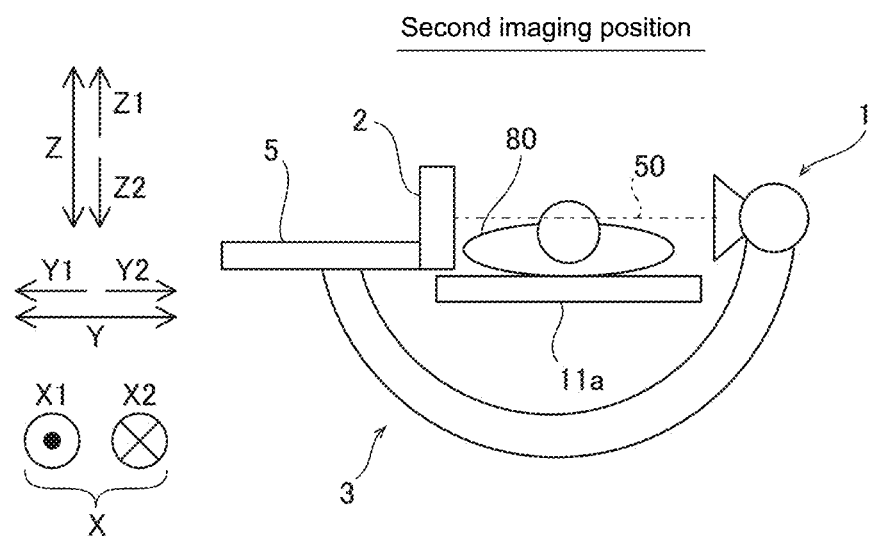
FIG. 7 is a schematic diagram for explaining a second imaging position according to one embodiment.

Further, the second imaging position is an imaging position where imaging is performed by moving the X-ray detector 2 and the arm 3 after imaging was performed at the first imaging position. FIG. 7 shows an example in which the position where the X-ray source 1 and the X-ray detector 2 are arranged so that the irradiation axis 50 extends along the Y-direction is selected as the second imaging position. In other words, FIG. 7 shows a case in which the imaging position for imaging the subject 80 from the direction along the body width 80*b* (see FIG. 3) of the subject 80 is stored in the storage unit 9 (see FIG. 1) as the preset information 70 (see FIG. 1), and the operator selects it as the second imaging position.

(Update of Subject Model)

Next, referring to FIG. 8, the processing of updating the subject model 90 by the model update unit 7*b* (see FIG. 1) will be described.

The subject model 90 is generated based on the information on the height and the weight of the subject 80 (see FIG. 2). Therefore, the thickness 90*a* (see FIG. 3) and the width 90*b* (see FIG. 3) of the generated subject model 90 may sometimes be larger than the body thickness 80*a* (see FIG. 3) and the body width 80*b* (see FIG. 3) of the actual subject 80. When the thickness 90*a* and the width 90*b* of the subject model 90 are greater than the body thickness 80*a* and the body width 80*b* of the subject 80, the first distance 30 (see FIG. 4) at the first target position 20 (see FIG. 4) becomes greater than the second distance 31 (see FIG. 5) at the second target position 21 (see FIG. 5). In that case, the target position of the X-ray detector 2 at the first imaging position is the second target position 21.

Figure 8:
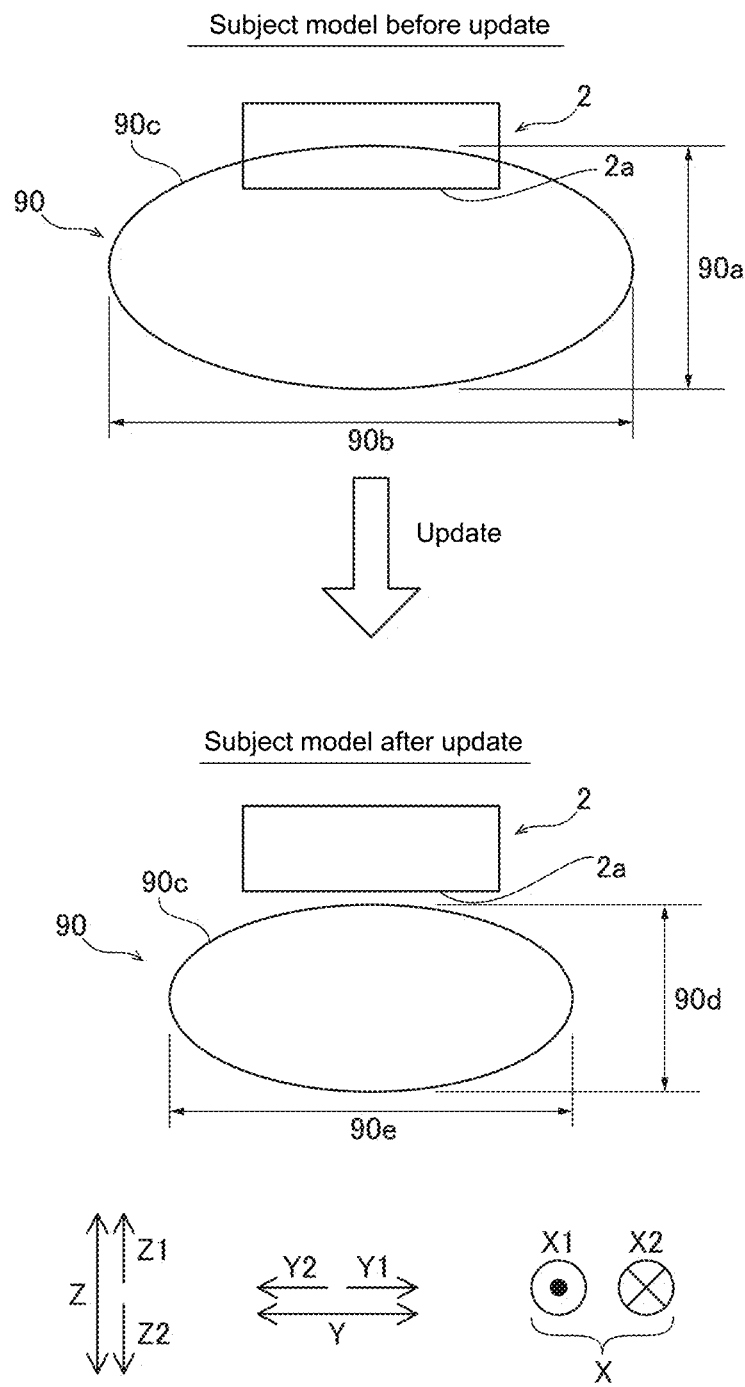
FIG. 8 is a schematic diagram for explaining a configuration in which a model update unit according to one embodiment updates a subject model.

Since the second target position 21 is set regardless of the subject model 90, when the X-ray detector 2 is placed at the second target position 21, the X-ray detector 2 may sometimes be placed inside the subject model 90, as shown in FIG. 8. Further, even in the case where the X-ray detector 2 is placed at the second target position 21, when the X-ray detector 2 is still far away from the subject 80, it may be conceivable that the operator manually moves the X-ray detector 2. Even in that case, as shown in FIG. 8, the X-ray detector 2 may be positioned inside the subject model 90.

In the case where the subject model 90 is not updated, the same thing could happen each time the imaging position is changed. Thus, the operator's workload can increase. Therefore, in this embodiment, the model update unit 7*b* (see FIG. 1) is configured to update the subject model 90. Specifically, the model update unit 7*b* is configured to move the X-ray detector 2 to the selected target position out of the first target position 20 (see FIG. 4) and the second target position 21 (see FIG. 5), and then update the subject model 90 stored in the storage unit 9 based on the relative position of the subject model 90 and the X-ray detector 2.

As shown in FIG. 8, the model update unit 7*b* is configured to update the subject model 90 when the X-ray detector 2 is placed inside the subject model 90. In this embodiment, the model update unit 7*b* updates the subject model 90 based on the position information of the X-ray detector 2 when the X-ray detector 2 is placed inside the subject model 90.

In the example shown in FIG. 8, since the X-ray detector 2 is moved in the Z-direction, the model update unit 7*b* updates the thickness 90*a* of the subject model 90 to a thickness 90*d* based on the position information on the X-ray detector 2 when the X-ray detector 2 is positioned inside the subject model 90. Thereafter, the model update unit 7*b* updates the width 90*b* of the subject model 90 to a width 90*e*. Note that when updating the width 90*b* of the subject model 90 to the width 90*e*, the model update unit 7*b* updates the width 90*b* of the subject model 90 to the width 90*e* so that the ratio of the width 90*b* to the thickness 90*a* and the ratio of the width 90*e* to the thickness 90*d* are similar.

Note that the model update unit 7*b* may be configured to update the subject model 90 based on the position of the X-ray detector 2 when the contact between the X-ray detector 2 and the subject 80 is no longer detected by the contact sensor 10 after the contact between the X-ray detector 2 and the subject 80 is detected. That is, the model update unit 7*b* initializes the subject model 90 when the contact between the X-ray detector 2 and the subject 80 is detected by the contact sensor 10. The model update unit 7*b* does not update the subject model 90 while the contact between the X-ray detector 2 and the subject 80 is being detected by the contact sensor 10, and resumes the updating of the subject model 90 from the time when the contact is no longer detected.

(Update of First Target Position and Setting of Second Target Position Corresponding to Input)

Next, referring to FIG. 9 and FIG. 10, the configuration in which the controller 7 (see FIG. 1) updates the first target position 20 (see FIG. 4) and the configuration in which the second target position 21 (see FIG. 5) is set corresponding to an input from the operator will be described. Note that the examples shown in FIG. 9 and FIG. 10 are examples in which the first target position 20 is updated and the second target position 21 is set according to the input when moving the X-ray detector 2 and the arm 3 from the first imaging position to the second imaging position.

Figure 9:
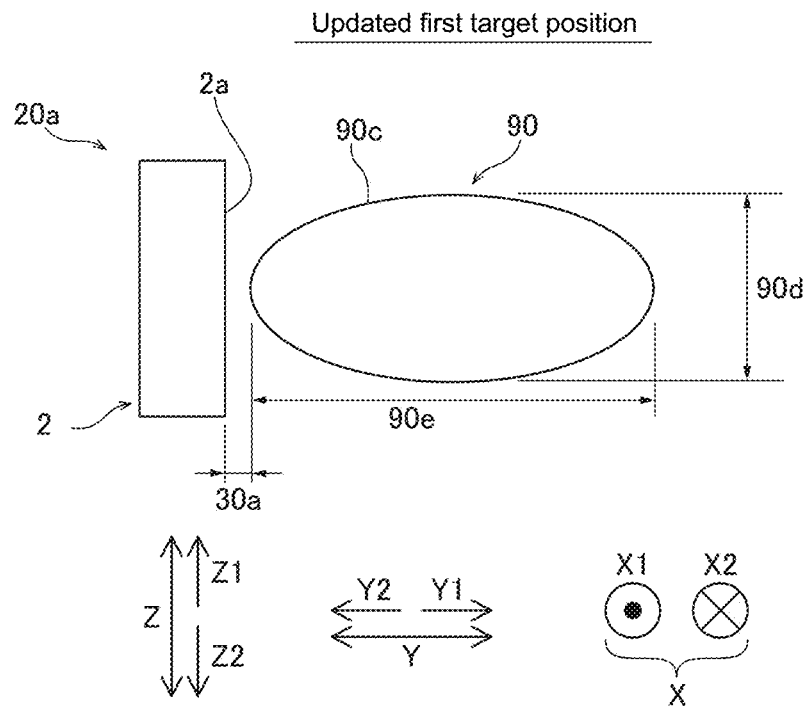
FIG. 9 is a schematic diagram for explaining an updated first target position according to one embodiment.

As shown in FIG. 9, in this embodiment, the controller 7 (see FIG. 1) is configured to update the first target position 20 based on the updated subject model 90 when changing the angle of arm 3 (see FIG. 1). Specifically, the controller 7 sets, as the updated first target position 20*a*, the position at which the X-ray detector 2 is brought into close contact with the surface 90*c* of the updated subject model 90 at the angle of the arm 3 according to the arm angle information 71 (see FIG. 1) included in the preset information 70 (see FIG. 1) selected by the operator. Note that the example shown in FIG. 9 shows a case in which the angle of the arm 3 is changed from the first imaging position to the second imaging position. In other words, the example shown in FIG. 9 shows the case where the X-ray detector 2 is moved so that the X-ray detector 2 approaches the subject model 90 from the Y-direction.

Figure 10:
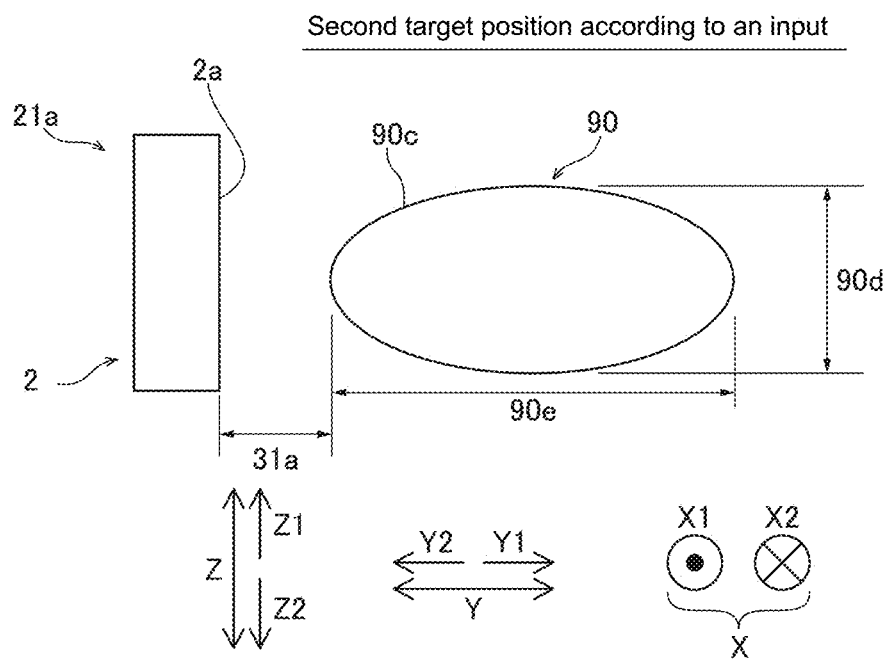
FIG. 10 is a schematic diagram for explaining a second target position according to an input according to one embodiment.

Furthermore, the example shown in FIG. 10 shows the second target position 21*a* according to the operator's input.

Specifically, the example shown in FIG. 10 shows the second target position 21*a* in the case where the X-ray detector 2 is placed at the first imaging position, the subject model 90 is updated, and then the X-ray detector 2 is placed at the second imaging position.

In this embodiment, when changing the angle of the arm 3, the controller 7 is configured to select the target position with the shorter distance of the X-ray detector 2 to the surface 90*c* of the subject model 90 out of the updated first target position 20*a* and the second target position 21*a* corresponding to the angle of the arm 3 after the change.

As shown in FIG. 9 and FIG. 10, the subject model 90 has been updated, and therefore, the thickness 90*d* and the width 90*e* of the subject model 90 became smaller than the thickness 90*a* (see FIG. 3) and the width 90*b* (see FIG. 3) of the subject model 90 before the update. Therefore, the first distance 30*a* (see FIG. 9) which is a distance between the X-ray detector 2 and the subject model 90 at the updated first target position 20*a* is shorter than the distance 31*a* (see FIG. 10) between the X-ray detector 2 according to the input and the subject model 90 at the second target position 21*a*. Therefore, when moving the X-ray detector 2 to the second imaging position, the controller 7 performs the control to move the X-ray detector 2 toward the updated first target position 20*a*.

(Change of Imaging Position)

Figure 11A:
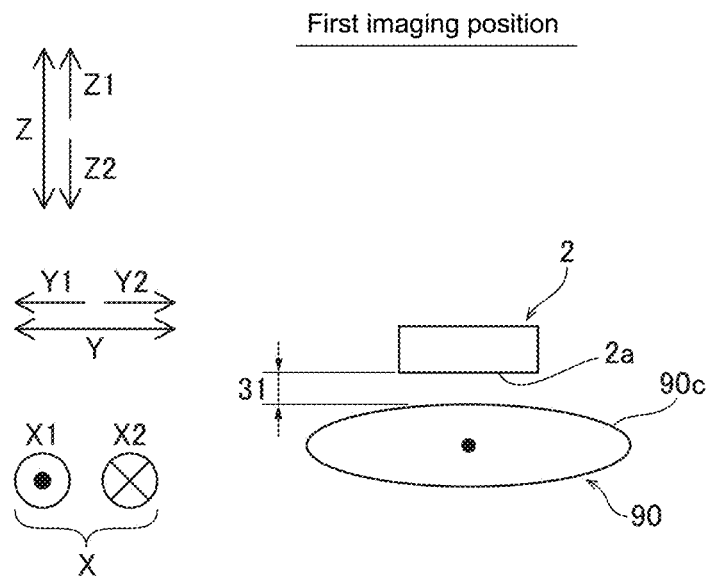
FIG. 11A is a schematic diagram showing a state in which an X-ray detector is placed at a first imaging position in a configuration in which an X-ray imaging apparatus according to one embodiment automatically moves an arm.

Next, referring to FIG. 11A to FIG. 11D, the control of the controller 7 (see FIG. 1) when automatically changing the imaging position from the first imaging position to the second imaging position will be described. FIG. 11A is a schematic diagram in the case where the X-ray detector 2 is placed at the first imaging position. The example shown in FIG. 11A shows the state in which the X-ray detector 2 is moved to the second target position 21 (see FIG. 5), and then the subject model 90 is updated.

Figure 11B:
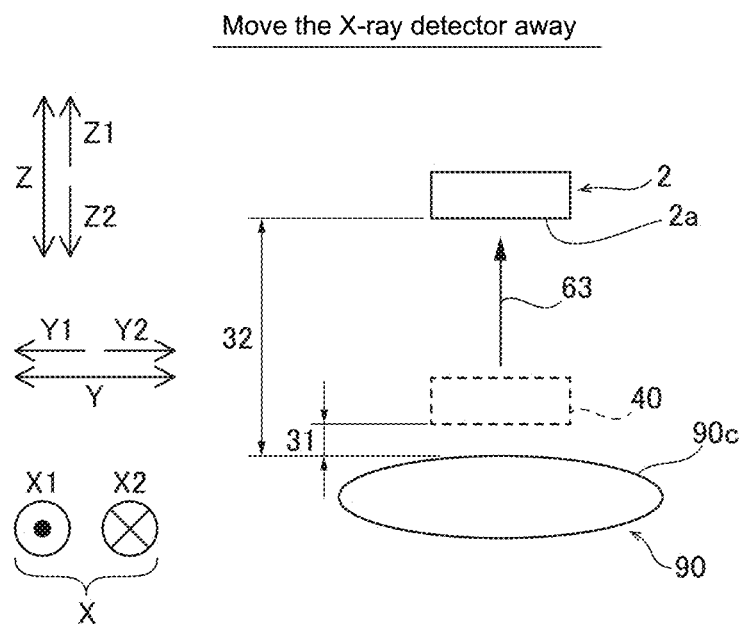
FIG. 11B is a schematic diagram for explaining a configuration in which an X-ray detector is moved away from a subject model from the state shown in FIG. 11A.

As shown in FIG. 11B, the controller 7 moves the X-ray detector 2 backward by the X-ray detector moving mechanism 5 (see FIG. 1) in advance, or moves the X-ray detector 2 backward while changing at least one of the position and the angle of the arm 3 (see FIG. 1). Specifically, the controller 7 moves the X-ray detector 2 backward from the position shown by the dashed line 40 to the position where the distance from the X-ray detector 2 to the subject model 90 is a distance 32, as shown by the arrow 63. Note that the distance 32 is a distance away from the surface 90*c* of the subject model 90 to the extent that the X-ray detector 2 does not come into contact with the subject 80 when moving the arm 3. Further, the distance 32 is a distance whose size is set in advance regardless of the subject model 90.

Figure 11C:
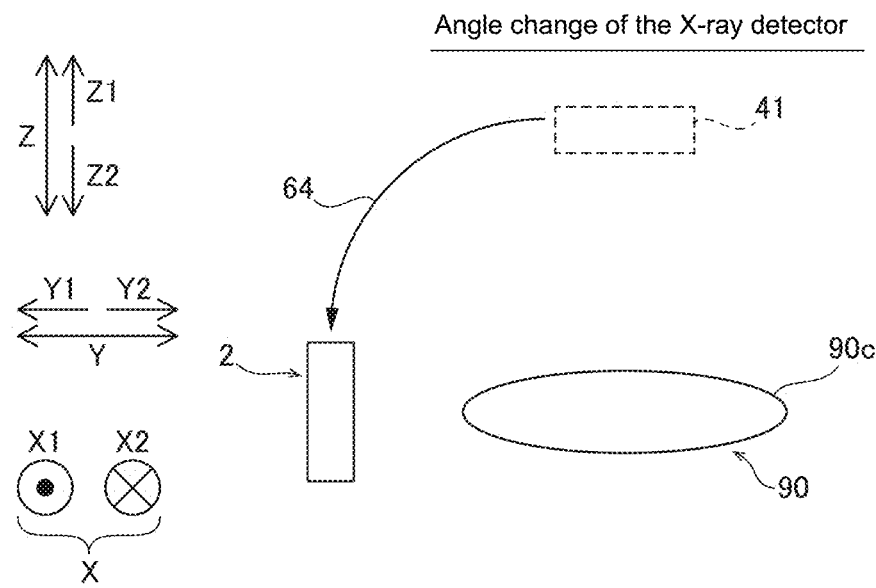
FIG. 11C is a schematic diagram for explaining a configuration in which an angle of an X-ray detector is changed from the state shown in FIG. 11B.

Next, as shown in FIG. 11C, the controller 7 rotates the arm 3 by controlling the arm driving mechanism 4 (see FIG. 1) and the arm position changing mechanism 12 (see FIG. 1). Specifically, as shown by the arrow 64, the controller 7 rotates the X-ray detector 2 by 90 degrees from the position shown by the dashed line 41.

Figure 11D:
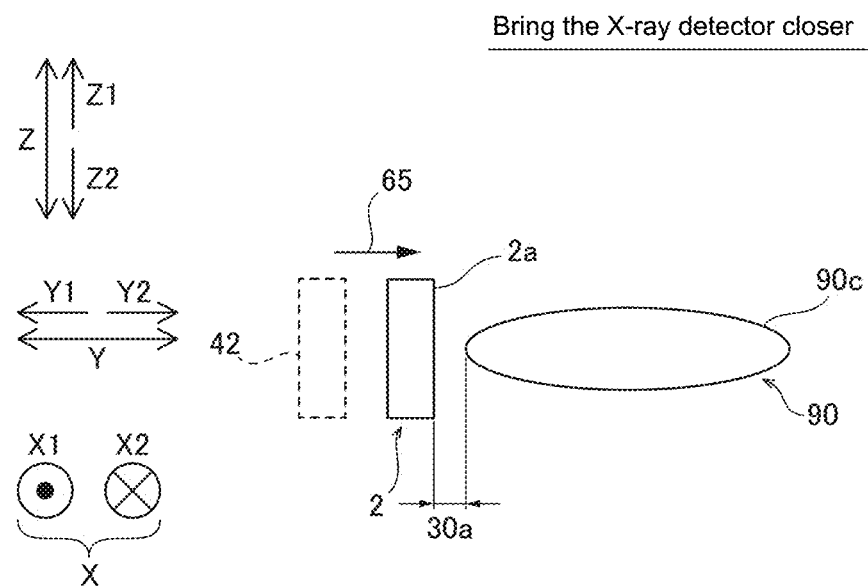
FIG. 11D is a schematic diagram for explaining a configuration in which an X-ray detector is moved closer to a subject model from the state shown in FIG. 11C.

Next, as shown in FIG. 11D, the controller 7 is configured to perform a control of the adjustment operation of the X-ray detector 2 by rotating the X-ray detector 2 by 90 degrees and then moving the X-ray detector 2 forward by the X-ray detector moving mechanism 5. Specifically, as shown by the arrow 65, the controller 7 moves the X-ray detector 2 in the Y2-direction from the position shown by the dashed line 42 so that the distance between the X-ray detector 2 and the surface 90*c* of the subject model 90 at the second imaging position becomes the first distance 30*a*. With this, the change from the first imaging position to the second imaging position is completed. Note that the first distance 30*a* is a distance between the surface 2*a* of the X-ray detector 2 at the updated first target position 20*a* (see FIG. 9) and the surface 90*c* of the subject model 90.

Figure 12:
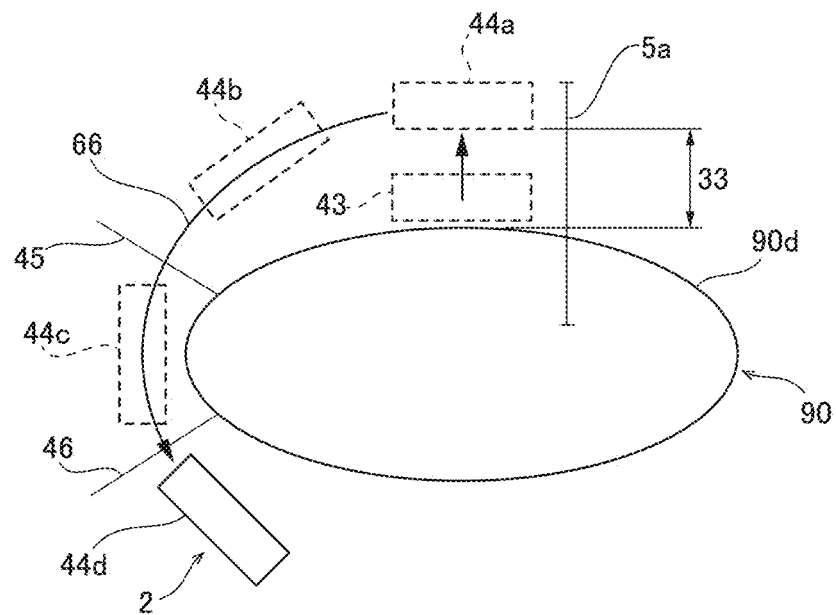
FIG. 12 is a schematic diagram for explaining a configuration in which a controller controls a moving speed of an arm according to one embodiment.

Here, depending on the angle and the position of the arm 3, the X-ray detector 2 may collide with the subject 80 even in the case where the arm 3 is moved in a state in which the X-ray detector 2 is moved backward to the retraction limit as shown in FIG. 12. Note that the retraction limit of the X-ray detector 2 is a position where the X-ray detector 2 is positioned farthest away from the subject model 90 within the moving range 5*a* of the X-ray detector 2 by the X-ray detector moving mechanism 5 (see FIG. 1).

Therefore, the controller 7 is configured to perform the control to decrease the moving speed of the arm 3 when the distance between the X-ray detector 2 and the subject model 90 falls equal to or shorter than a predetermined threshold when moving the arm 3.

Referring to FIG. 12, a specific example of a configuration in which the controller 7 (see FIG. 1) controls the moving speed of the arm 3 (see FIG. 1) will be described. FIG. 12 shows an example in which the X-ray detector 2 is moved backward from the position shown by the dashed line 43 to the position shown by the dashed line 44, and the X-ray detector 2 is moved along the arrow 66.

The controller 7 controls the X-ray detector moving mechanism 5 (see FIG. 1) to move the X-ray detector 2 backward from the position indicated by the dashed line 43 to the position ("retraction limit") indicated by the dashed line 44. Then, the controller 7 controls the arm driving mechanism 4 (see FIG. 1) and the arm position changing mechanism 12 (see FIG. 1) to move the arm 3. When moving the arm 3, the X-ray detector 2 is moved along the trajectory indicated by the arrow 66. That is, the X-ray detector 2 is moved to the position shown by the solid line 44*d*, via the position shown by the dashed line 44*a*, the position shown by the dashed line 44*b*, and the position shown by the dashed line 44*c*.

The controller 7 is configured to perform a control to reduce the moving speed of the arm 3 when the distance 33 between the surface 90*c* of the subject model 90 and the surface 2*a* of the X-ray detector 2 becomes equal to or less than a predetermined threshold. The controller 7 is configured to decrease, for example, the moving speed of the arm 3 at a constant rate. For example, the controller 7 reduces the moving speed of the arm 3 to 80% of the normal speed. Further, the predetermined threshold is, for example, 3 cm.

At the position shown by the dashed line 44*a*, the position shown by the dashed line 44*b*, and the position shown by the solid line 44*d*, the distance 33 between the X-ray detector 2 and the surface 90*c* of the subject model 90 is greater than the threshold. Further, at the position indicated by the dashed line 44*c*, the distance 33 between the X-ray detector 2 and the surface 90*c* of the subject model 90 is equal to or less than the threshold. In other words, on the trajectory of arrow 66, within the range from the solid line 45 to the solid line 46, the distance 33 between the X-ray detector 2 and the surface 90*c* of the subject model 90 is equal to or less than the threshold. Therefore, the controller 7 moves the arm 3 in the normal speed mode in the range up to the solid line 45 and in the range after the solid line 46 on the trajectory indicated by the arrow 66. Further, the controller 7 moves the arm 3 in a low-speed mode within the range from the solid line 45 to the solid line 46 on the trajectory indicated by the arrow 66.

Note that the normal speed mode is a mode for moving the arm 3 without reducing the moving speed of the arm 3.

Further, the low-speed mode is a mode for moving the arm 3 by reducing the moving speed of the arm 3.

By configuring as described above, it is possible to reduce the moving speed of the arm 3, and therefore, the impact of the X-ray detector 2 when it collides with the subject 80 during the movement of the arm 3 can be reduced.

Further, for example, in the case where the operator manually moves the arm 3 by means of a joystick, the controller 7 is configured to change the moving speed of the arm 3 in accordance with the tilt amount of the joystick. When the operator manually moves the arm 3 by means of the joystick, the controller 7 is configured to control the moving speed of the arm 3 to decrease even in the case where the distance between the X-ray detector 2 and the subject model 90 becomes equal to or less than the predetermined threshold. Specifically, the controller 7 performs the control to reduce the moving speed of the arm 3 by uniformly decreasing the moving speed of the arm 3 which is changed in accordance with the tilt amount of the joystick. For example, the controller 7 reduces the moving speed of the arm 3 which changes according to the tilt amount of the joystick to 80% of the speed uniformly.

Figure 13:
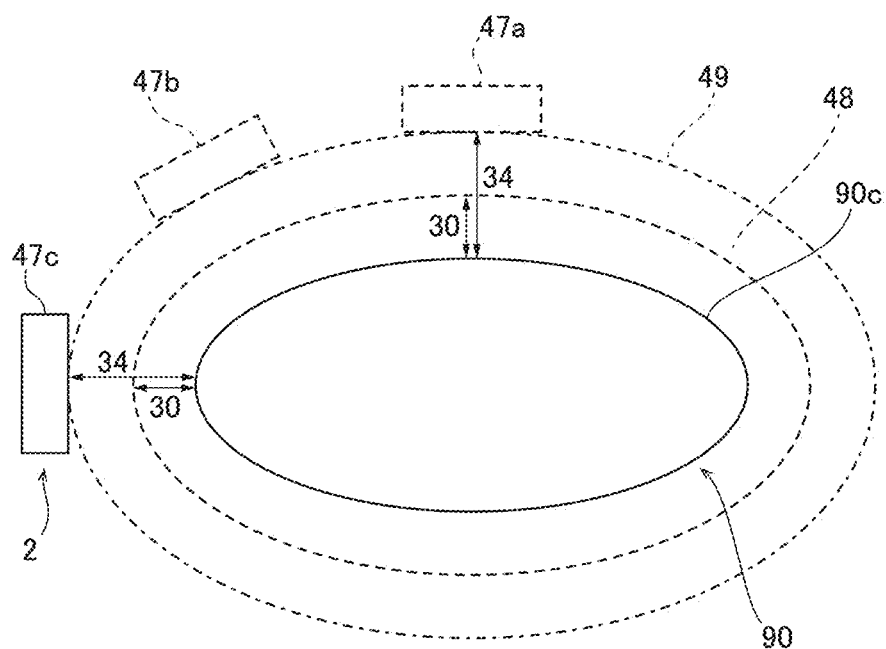
FIG. 13 is a schematic diagram for explaining a control in which a controller moves an arm based on an operator's operation input according to one embodiment.

Furthermore, for example, in the case where the operator manually moves the arm 3 (see FIG. 2) by means of a joystick, the controller 7 (see FIG. 1) is configured to move the arm 3 in a state in which the distance 34 between the X-ray detector 2 and the subject model 90 is maintained as shown in FIG. 13. FIG. 13 shows an example in which the X-ray detector 2 is moved from the state in which the X-ray detector 2 is positioned at the distance 34 between the X-ray detector 2 and the surface 90c of the subject model 90 (position shown by the dashed line 47a), via the position shown by the dashed line 47b, to the position shown by the solid line 47c. At this time, for example, even in the case where the distance 34 is greater than the first distance 30, the controller 7 does not move the arm 3 and the X-ray detector 2 so that the distance between the X-ray detector 2 and the surface 90c of the subject model 90 after moving the arm 3 becomes the first distance 30, but moves the arm 3 so that the distance 34 between the X-ray detector 2 and the surface 90c of the subject model 90 is maintained at the distance 34 before moving the arm 3.

That is, when moving the X-ray detector 2, via the position indicated by the dashed line 47a and the position indicated by the dashed line 47b, to the position indicated by the solid line 47c, the X-ray detector 2 does not move the arm 3 while bringing the X-ray detector 2 closer to the surface 90c of the subject model 90 (while moving forward) so as to follow the trajectory 48 indicated by the dashed line, but moves the arm 3 so as to move along the trajectory 49 shown by the single-dotted line.

Note that the trajectory 48 is a trajectory for moving the X-ray detector 2 so as to maintain the distance between the X-ray detector 2 and the surface 90c of the subject model 90 at the first distance 30. Further note that the trajectory 49 is a trajectory for moving the X-ray detector 2 so as to maintain the distance between the X-ray detector 2 and the surface 90c of the subject model 90 at the distance 34. By configuring as described above, the arm 3 is moved in a state in which the distance 34 between the X-ray detector 2 and the surface 90c of the subject model 90 is maintained, and therefore, it is possible to prevent the advance movement of the X-ray detector 2, which is unintended by the operator.

Further, the controller 7 is configured to perform the control to regulate the movement of the X-ray detector 2 when the contact between the X-ray detector 2 and the subject 80 is detected by the contact sensor 10. Specifically, the controller 7 is configured to perform the control to regulate the movement of the X-ray detector 2 in the direction approaching the subject 80. Further, the controller 7 is configured to perform the control to regulate the movement of the arm 3 when the contact between the X-ray detector 2 and the subject 80 is detected by the contact sensor 10.

Specifically, the controller 7 is configured to perform the control to regulate the movement of the arm 3 in the direction approaching the subject 80. With this, when the X-ray detector 2 came into contact with the subject 80, the movement of the X-ray detector 2 and the arm 3 from the position where the X-ray detector 2 came into contact with the subject 80 to the direction approaching the subject 80 is regulated. This prevents the X-ray detector 2 from further moving in the direction approaching the subject 80 from the position where the X-ray detector 2 came into contact with the subject.

(Imaging Processing of Subject)

Figure 14:
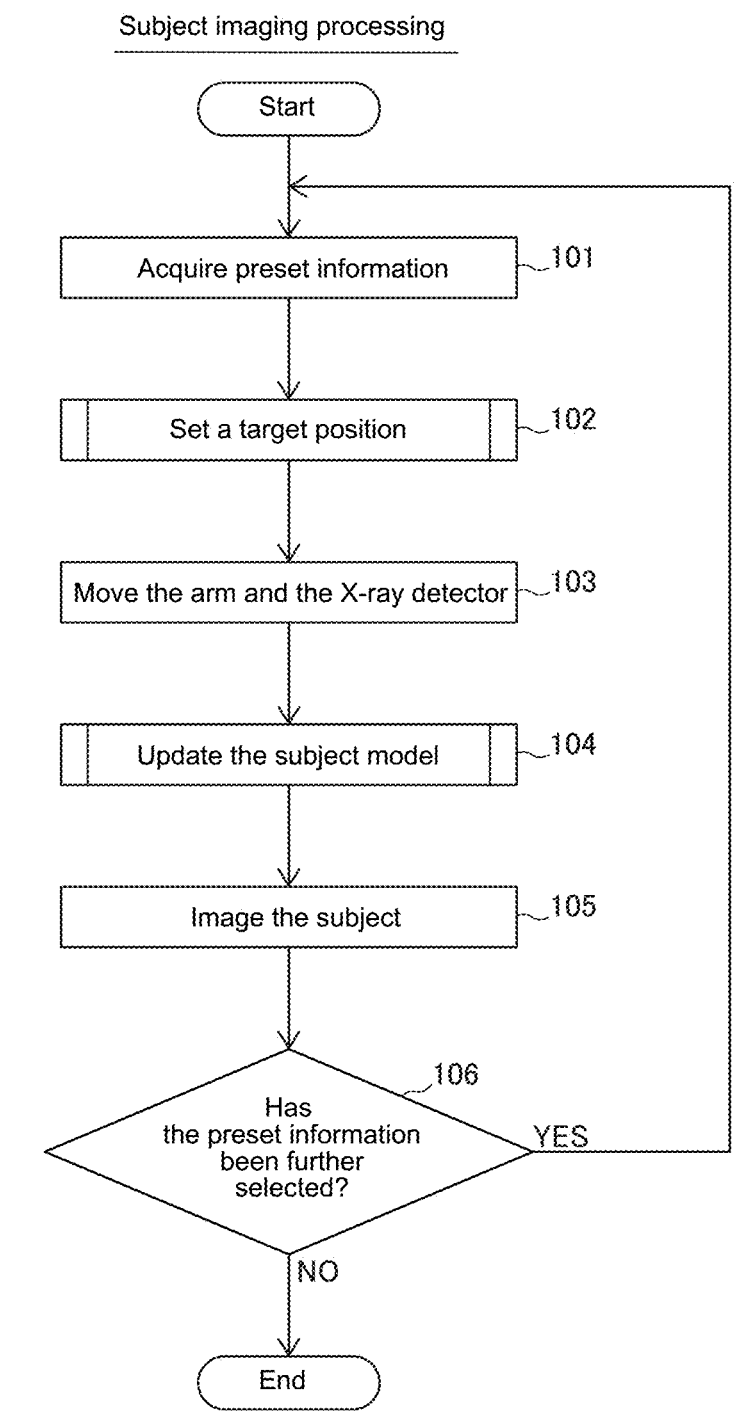
FIG. 14 is a flowchart for explaining the processing of imaging a subject by an X-ray imaging apparatus according to one embodiment.

Next, referring to FIG. 14, the configuration in which the X-ray imaging apparatus 100 (see FIG. 1) images the subject 80 (see FIG. 2) will be described.

In Step 101, the controller 7 (see FIG. 1) acquires preset information 70 (see FIG. 1). Specifically, the controller 7 acquires preset information 70 selected by the operator out of the plurality of pieces of preset information 70 stored in the storage unit 9 (see FIG. 1).

In Step 102, the controller 7 sets the target position of the X-ray detector 2 (see FIG. 1). The details of the processing for setting the target position when the controller 7 moves the X-ray detector 2 will be described later.

In Step 103, the controller 7 controls the arm driving mechanism 4 (see FIG. 1) and the arm position changing mechanism 12 (see FIG. 1) to move the arm 3. Specifically, the controller 7 moves the arm 3 so that its angle becomes the angle of the arm angle information 71 (see FIG. 1) included in the preset information 70. Further, the controller 7 controls the X-ray detector moving mechanism 5 (see FIG. 1) to move the X-ray detector 2. Specifically, the controller 7 moves the X-ray detector 2 to the target position set in Step 102.

In Step 104, the model update unit 7b (see FIG. 1) updates the subject model 90 (see FIG. 1). The details of the processing in which the model update unit 7b updates the subject model 90 will be described below.

In Step 105, the controller 7 controls the X-ray source 1 (see FIG. 1) and the X-ray detector 2 to image the subject 80.

In Step 106, the controller 7 determines whether the preset information 70 has been further selected. In the case where the preset information 70 has been further selected, the processing proceeds to Step 101. In the case where no further preset information 70 has been selected, the processing is terminated.

By performing the above processing, the X-ray imaging apparatus 100 images the subject 80 at a plurality of imaging positions.

(Movement Processing of X-ray Detector)

Figure 15:
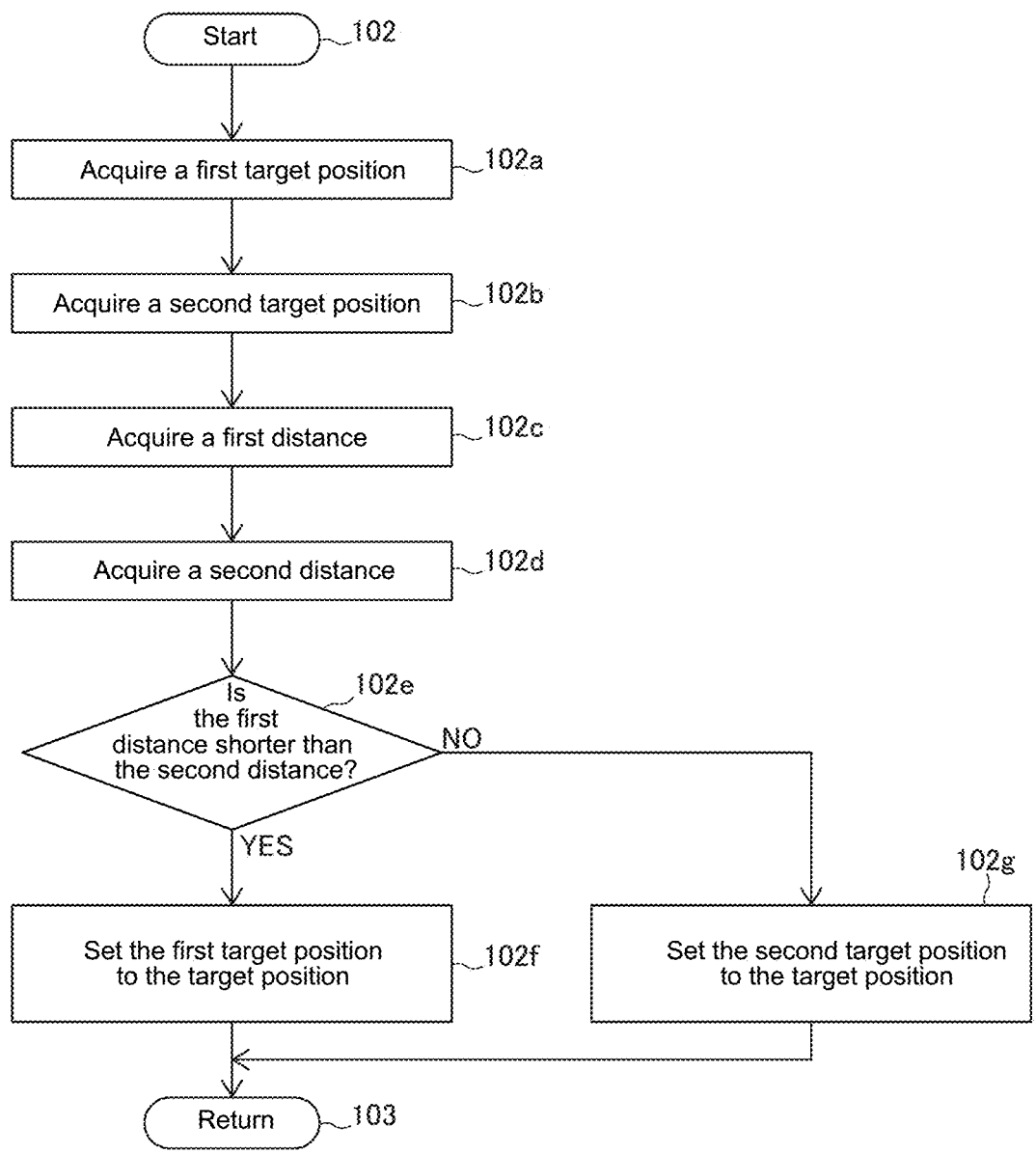
FIG. 15 is a flowchart for explaining the processing for an X-ray imaging apparatus to set a target position of an X-ray detector according to one embodiment.

Next, referring to FIG. 15, the processing in which the controller 7 (see FIG. 1) controls the X-ray detector moving mechanism 5 (see FIG. 1) to move the X-ray detector 2 (see FIG. 1) will be described.

In Step 102a, the controller 7 acquires the first target position 20 (see FIG. 4). Specifically, the controller 7 acquires the arm angle information 71 (see FIG. 1) included in the preset information 70 (see FIG. 1) selected by the operator. The controller 7 acquires, as the first target position 20, the position at which the X-ray detector 2 is brought into close contact with the subject model 90 at the angle of the arm 3 based on the acquired arm angle information 71.

In Step 102b, the controller 7 acquires a second target position 21 (see FIG. 5). Specifically, the controller 7 acquires, as the second target position 21, the position of the X-ray detector 2 based on the arm angle information 71 and the detector position information 72 (see FIG. 1) included in the preset information 70 selected by the operator.

In Step 102c, the distance acquisition unit 7a (see FIG. 1) acquires a first distance 30 (see FIG. 4). Specifically, the distance acquisition unit 7a acquires, as the first distance 30, the distance from the surface 2a of the X-ray detector 2 (see FIG. 4) to the surface 90c (see FIG. 4) of the subject model 90 (see FIG. 4), when assuming that the X-ray detector 2 is positioned at the first target position 20.

In Step 102d, the distance acquisition unit 7a acquires a second distance 31 (see FIG. 5). Specifically, the distance acquisition unit 7a acquires, as the second distance 31, the distance from the surface 2a of the X-ray detector 2 to the surface 90c of the subject model 90, when assuming that the X-ray detector 2 is positioned at the second target position 21.

In Step 102e, the controller 7 determines whether the first distance 30 is shorter than the second distance 31. When the first distance 30 is shorter than the second distance 31, the processing proceeds to Step 102f. When the first distance 30 is longer than the second distance 31, the processing proceeds to Step 102g. That is, when the second distance 31 is shorter than the first distance 30, the processing proceeds to Step 102g.

In Step 102f, the controller 7 sets the first target position 20 as the target position of the X-ray detector 2. Thereafter, the processing proceeds to Step 103.

Further, when the processing proceeded from Step 102e to Step 102g, in Step 102g, the controller 7 sets the second target position 21 as the target position of the X-ray detector 2. Thereafter, the processing proceeds to Step 103.

Note that the processing of Step 102c may be performed after the processing of Step 102a. Further, the processing of Step 102d may be performed after the processing of Step 102b. Further, either the processing of Step 102a or the processing of Step 102b may be performed first.

Further, in the case of executing the processing to move the X-ray detector 2 after the subject model 90 has been updated, the controller 7 acquires the updated first target position 20a (see FIG. 9) in Step 102a. Further, in Step 102b, the controller 7 acquires the second target position 21a (see FIG. 10) corresponding to the input.

(Update Processing of Subject Model)

Figure 16:
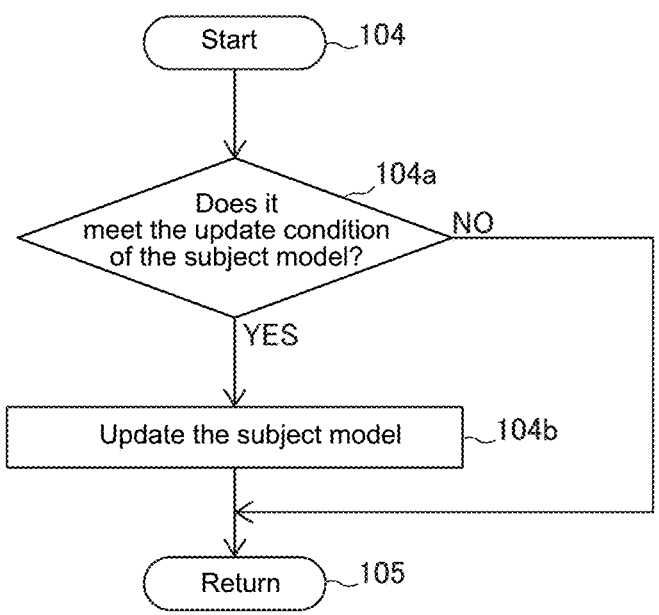
FIG. 16 is a flowchart for explaining the processing in which a model update unit according to one embodiment updates a subject model.

Next, referring to FIG. 16, the processing of updating the subject model 90 by the model update unit 7b (see FIG. 1) will be described.

In Step 104a, the controller 7 (see FIG. 1) determines whether the update conditions for the subject model 90 are met. When the update conditions for the subject model 90 are not met, the processing proceeds to Step 105. When the update conditions for the subject model 90 are met, the processing proceeds to Step 104b. Note that the update condition of the subject model 90 includes, for example, whether the X-ray detector 2 is positioned on the inner side of the subject model 90. Further, the update conditions for the subject model 90 include whether the X-ray detector 2 has come into contact with the subject 80 (see FIG. 2).

In Step 104b, the model update unit 7b updates the subject model 90. In the case where the conditions whether the X-ray detector 2 is positioned inside the subject model 90 are met as the update conditions of the subject model 90, the model update unit 7b updates the subject model 90 based on the position information of the X-ray detector 2 positioned on the inner side of the subject model 90. Further, in the case where the condition whether the X-ray detector 2 has come into contact with the subject 80 is met as the update condition of the subject model 90, the model update unit 7b updates the subject model 90 based on the position information of the X-ray detector 2 at the position where it has come into contact with the subject 80. The model update unit 7b updates the thickness 90a (see FIG. 3) and the width 90b (see FIG. 3) of the subject model 90 to update the subject model 90. Thereafter, the processing proceeds to Step 105.

(Arm Moving Speed Adjustment Processing)

Figure 17:
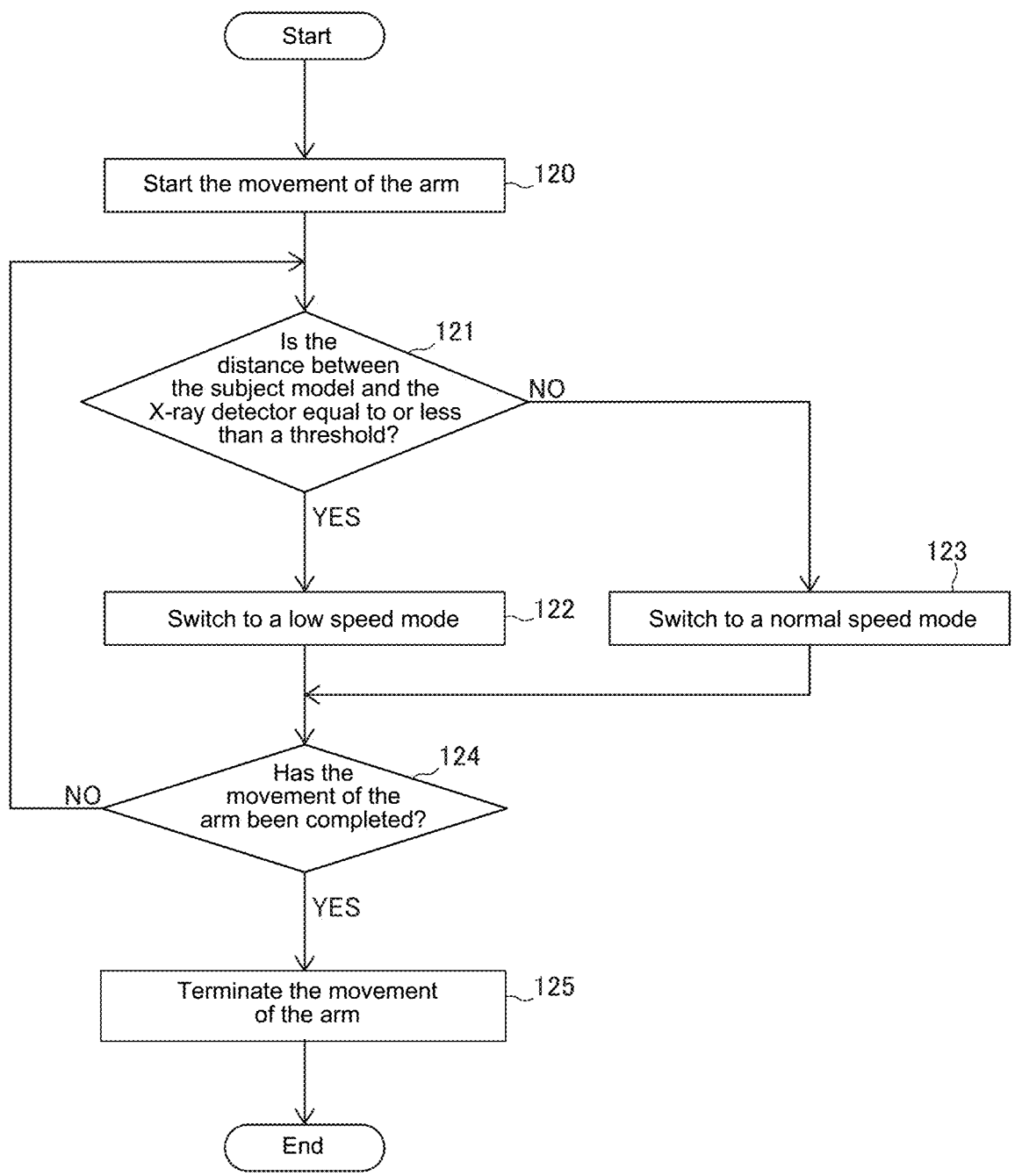
FIG. 17 is a flowchart for explaining the processing in which the controller according to one embodiment controls a moving speed of an arm.

Next, referring to FIG. 17, the processing for the controller 7 (see FIG. 1) to adjust the moving speed of the arm 3 (see FIG. 1) will be described. Note that the processing for the controller 7 to control the moving speed of the arm 3 is performed in parallel with the processing to move the arm 3 in Step 103 shown in FIG. 14. In other words, the controller 7 also performs the processing to control the moving speed of the arm 3 while performing the control to move the arm 3.

In Step 120, the controller 7 controls the arm driving mechanism 4 (see FIG. 1) and the arm position changing mechanism 12 (see FIG. 1) to initiate the movement of the arm 3.

In Step 121, the controller 7 determines whether the distance between the subject model 90 (see FIG. 1) and the X-ray detector 2 (see FIG. 1) is equal to or less than a threshold. Specifically, the controller 7 determines whether the distance 33 (see FIG. 12) between the surface 90c (see FIG. 4) of the subject model 90 and the surface 2a (see FIG. 4) of the X-ray detector 2 is equal to or less than a threshold. When the distance 33 is equal to or less than the threshold, the processing proceeds to Step 122. When the distance 33 is greater than the threshold, the processing proceeds to Step 123.

In Step 122, the controller 7 switches to the low-speed mode. The controller 7 is configured to decrease, for example, the moving speed of the arm 3 at a constant rate. Note that in a case where the moving speed of the arm 3 has already been reduced, the processing of Step 122 is skipped. In other words, the controller 7 does not perform the control to further reduce the moving speed of the arm 3 in the low-speed mode. Thereafter, the processing proceeds to Step 124.

Further, when the processing has proceeded from Step 121 to Step 123, in Step 123, the controller 7 switches to the normal speed mode. Note that when the mode has not been switched to the low-speed mode, the processing of Step 123 is skipped. Thereafter, the processing proceeds to Step 124.

In Step 124, the controller 7 determines whether the movement of the arm 3 has been completed. When the movement of the arm 3 has not been completed, the processing proceeds to Step 121. When the movement of the arm 3 has been completed, the processing proceeds to Step 125.

In Step 125, the controller 7 terminates the movement of the arm 3. Thereafter, the processing is terminated.

Effects of this Embodiment

In this embodiment, the following effects can be obtained.
In this embodiment, as described above, the X-ray imaging apparatus 100 is provided with:
an X-ray source 1 configured to irradiate a subject 80 with X-rays;

an X-ray detector 2 configured to detect X-rays emitted from the X-ray source 1;

an arm 3 configured to hold the X-ray source 1 and the X-ray detector 2;

an arm driving mechanism 4 configured to move the arm 3;

an X-ray detector moving mechanism 5 provided on the arm 3 to move the X-ray detector 2 forward or backward in an X-ray irradiation axis direction 50;

a model acquisition unit 6 configured to acquire a subject model 90 which is a model of a surface shape of the subject 80; and a controller 7 configured to select a target position in which a distance of the X-ray detector 2 to the surface 90c of the subject model 90 is shorter, out of the first target position 20 which is a target position of the X-ray detector 2 set based on a position of the subject model 90 and the second target position 21 which is a target position of the X-ray detector 2 set in advance and control the X-ray detector moving mechanism 5 to move the X-ray detector 2 toward the selected target position.

With this configuration, the X-ray detector 2 is moved to a target position closer to the surface 90c of the subject model 90 out of the first target position 20 based on the subject model 90 and the preset second target position 21. Therefore, as compared with the configuration in which the X-ray detector 2 is moved based only on the subject model 90, it is possible to suppress the X-ray detector 2 from becoming too far away from the subject 80. Therefore, it becomes possible to suppress the operator from further moving the X-ray detector 2 after the movement of the X-ray detector 2 by the X-ray detector moving mechanism 5, thereby suppressing the increase in the operator's workload.

Furthermore, in the case where the accuracy of the subject model 90 is high, the X-ray detector 2 is moved toward the first target position 20. Because the accuracy of the subject model 90 is high, there is no need for the operator to further move the X-ray detector 2 after moving it to the first target position 20, which can suppress the increase in the operator's workload. As a result, it is possible to suppress the increase in the operator's workload while suppressing the increase in the distance between the subject 80 and the X-ray detector 2.

Further, in the above-described embodiment, the following further effects can be obtained by configuring as follows.

That is, in this embodiment, as described above, it is further provided with the distance acquisition unit 7a for acquiring the first distance 30 which is a distance between the first target position 20 and the surface 90c of the subject model 90, and the second distance 31 which is the distance between the second target position 21 and the surface 90c of the subject model 90. The controller 7 is configured to compare the first distance 30 and the second distance 31 acquired by the distance acquisition unit 7a, and control the X-ray detector moving mechanism 5 to move the X-ray detector 2 toward the first target position 20 when the first distance 30 is shorter than the second distance 31 and move the X-ray detector 2 toward the second target position 21 when the second distance 31 is shorter than the first distance 30.

With this, the controller 7 can easily acquire the target position closer to the surface 90c of the subject model 90 out of the first target position 20 and the second target position 21, based on the first distance 30 and the second distance 31. As a result, the controller 7 can easily move the X-ray detector 2 to a position where the X-ray detector 2 comes into close contact with the subject 80.

Furthermore, in this embodiment, as described above, it is further provided with the input reception unit 8 for receiving the operator's operation input, and the controller 7 is configured to compare the first target position 20 and the second target position 21 set based on the operator's operation input.

With this, it is possible to move the X-ray detector 2 to a position where the X-ray detector 2 comes closer to the subject 80 out of the first target position 20 and the second target position 21 set based on the operation input. Therefore, the operator can position the X-ray detector 2 in a state of being closer to the subject 80 according to the site to be imaged and the angle of the arm 3 by performing an operation to select the site where the subject 80 is imaged, the angle information (arm angle information 71) of the arm 3, etc. As a result, the user's convenience (usability) can be improved.

Furthermore, in this embodiment, as described above, it is further provided with a storage unit 9 for storing a subject model 90, and a model update unit 7b for updating the subject model 90 stored in the storage unit 9 based on the relative position between the subject model 90 and the X-ray detector 2 after moving the X-ray detector 2 to target position selected from the first target position 20 and the second target position 21. The controller 7 is configured to update the first target position 20 based on the updated subject model 90 when changing the angle of the arm 3.

With this configuration, unlike the configuration in which the subject model 90 is not updated, it is possible to improve the accuracy of the thickness 90a and the width 90b of the subject model 90 each time when the X-ray detector 2 is moved. Furthermore, unlike the configuration in which the first target position 20 is not updated, the first target position 20 is updated based on the subject model 90 with improved accuracy in the thickness 90a and the width 90b. Therefore, the position of the X-ray detector 2 at the first target position 20 can be brought closer to the subject 80. As a result, by moving the X-ray detector 2 with respect to the first target position 20a updated based on the subject model 90 with higher accuracy in the thickness 90a and the width 90b, it is possible to bring the X-ray detector 2 closer to the subject 80.

Further, in this embodiment, when changing the angle of the arm 3, the controller 7 is configured to select the target position with the shorter distance of the X-ray detector 2 to the surface 90c of the subject model 90 out of the updated first target position 20a and the second target position 21a corresponding to the angle of the arm 3 after the change.

Here, the updated first target position 20a is set based on the updated subject model 90. For this reason, the first distance 30a at the updated first target position 20a is shorter than the first distance 30 at the first target position 20 before the update. Therefore, by configuring as described above, when changing the angle of the arm 3, the target position closer to the surface 90c of the subject model 90 is selected out of the updated first target position 20a and the second target position 21a corresponding to the angle of the arm 3 after the change. Therefore, as compared with the configuration in which the first target position 20 is not updated, it is possible to position the X-ray detector 2 closer to the subject 80.

Furthermore, in this embodiment, as described above, the model update unit 7b is configured to update the subject model 90 when the X-ray detector 2 is placed inside the subject model 90.

Here, when the X-ray detector 2 is placed inside the subject model 90, the thickness 90*a* and the width 90*b* of the subject model 90 are greater than the body thickness 80*a* and the body width 80*b* of the actual subject 80. In other words, the thickness 90*a* and the width 90*b* of the subject model 90 are low in accuracy. Therefore, by configuring as described above, by updating the subject model 90 based on the position of the X-ray detector 2 positioned inside the subject model 90, the thickness 90*a* and the width 90*b* of the subject model 90 can be made closer to the actual body thickness 80*a* and body width 80*b* of the subject 80. Therefore, the accuracy of the subject model 90 can be improved.

Further, in this embodiment, as described above, it is further provided with the contact sensor 10 installed on the X-ray detector moving mechanism 5 to detect whether the X-ray detector 2 and the subject 80 are brought into contact, and the model update unit 7*b* is configured to update the subject model 90 based on the position of the X-ray detector 2 when the contact between the X-ray detector 2 and the subject 80 is detected by the contact sensor 10 and then the contact between the X-ray detector 2 and the subject 80 is no longer detected.

With this, the actual body thickness 80*a* and body width 80*b* of the subject 80 can be acquired based on the position of the X-ray detector 2 when the X-ray detector 2 is brought into contact with the subject 80 and then the X-ray detector 2 is moved away from the subject 80. As a result, the subject model 90 can be updated based on the acquired body thickness 80*a* and body width 80*b* of the subject 80, and therefore, the accuracy of the subject model 90 can be further improved.

Furthermore, in this embodiment, as described above, the storage unit 9 is configured to store a plurality of pieces of preset information 70 including the arm angle information 71 which is information on the angle of the arm 3 at the target position and the detector position information 72 which is information on the position of the X-ray detector 2 in the direction of the X-ray irradiation axis 50. The controller 7 is configured to acquire the first target position 20 in the arm angle information 71 of the selected preset information 70 when any one of the plurality of pieces of preset information 70 is selected based on the operator's operation input by the input reception unit 8, acquire the detector position information 72 included in the selected preset information 70 as well, and compare the acquired first target position 20 and second target position 21.

With this, by selecting a desired preset information 70 by the operator out of the plurality of pieces of preset information 70, it is possible to position the X-ray detector 2 in a state in which the X-ray detector 2 is positioned closer to the subject 80 at the angle of the arm 3 and the position of the X-ray detector 2 that the operator desires.

Further, in a clinical site, when there is no urgent need, before the operator images the subject 80, there may be a case in which the preset information 70 is stored in the storage unit 9, the preset information 70 including the arm angle information 71 and the detector position information 72 when the X-ray detector 2 is brought close to the subject 80 in advance. In this case, the controller 7 can acquire the second target position 21 closer to the subject 80 based on the arm angle information 71 and the detector position information 72 which were acquired based on the physique (the body thickness 80*a* and the body width 80*b* of the subject 80) of the subject 80. Therefore, the X-ray detector 2 is moved to a position closer to the subject 80 out of the first target position 20 and the second target position 21, so that the X-ray detector 2 can be moved closer to the subject 80.

Furthermore, in the case where urgency is required, the controller 7 acquires the second target position 21 based on the preset information 70 of the arm angle information 71 and the detector position information 72 of preset values. In this case, the second target position 21 may be far from the subject 80, but since the controller 7 compares the first target position 20 and the second target position 21 and moves the X-ray detector 2 to a closer position, the X-ray detector 2 can be suppressed from being placed at a position far from the subject 80. As a result, either in the case of urgency or in the case of non-urgency, it is possible to position the X-ray detector 2 closer to the subject 80 by selecting the desired preset information 70 by the operator.

<Modifications>

Note that the embodiments disclosed here should be considered illustrative and not restrictive in all respects. It should be noted that the scope of the present invention is indicated by claims and is intended to include all modifications (modified examples) within the meaning and scope of the claims and equivalents.

(First Modification)

For example, in the embodiment described above, an example of a configuration is shown in which the X-ray imaging apparatus 100 is equipped with one arm 3, but the present invention is not limited thereto. For example, as in the X-ray imaging apparatus 200 according to a first modification shown in FIG. 18, two arms may be provided.

Figure 18:
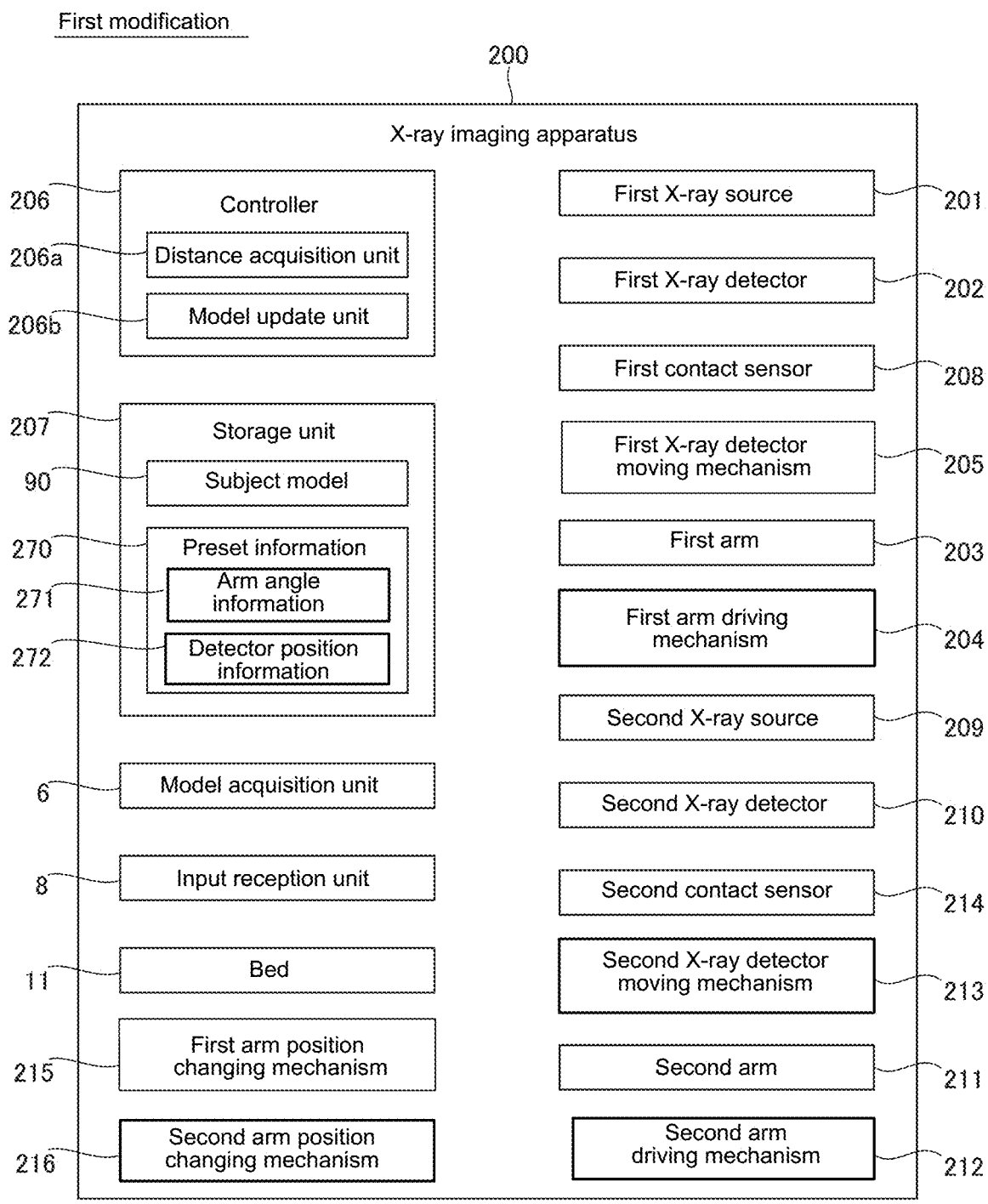
FIG. 18 is a block diagram showing an overall configuration of an X-ray imaging apparatus according to a first modification.

Specifically, as shown in FIG. 18, in the X-ray imaging apparatus 200 according to the first modification, the X-ray source 1 includes a first X-ray source 201 and a second X-ray source 209. The first X-ray source 201 and the second X-ray source 209 have the same configuration as the X-ray source 1, so the detailed description will be omitted.

Further, the X-ray detector 2 includes a first X-ray detector 202 for detecting X-rays emitted from the first X-ray source 201 and a second X-ray detector 210 for detecting X-rays emitted from the second X-ray source 209. The first X-ray detector 202 and the second X-ray detector 210 have the same configuration as the X-ray detector 2, so the detailed description will be omitted.

Further, the arm 3 includes a first arm 203 for holding the first X-ray source 201 and the first X-ray detector 202 and a second arm 211 for holding the second X-ray source 209 and the second X-ray detector 210. The first arm 203 has the same configuration as the arm 3 except that it holds the first X-ray source 201 and the first X-ray detector 202, so the detailed description will be omitted. The second arm 211 has the same configuration as the arm 3 except that it holds the second X-ray source 209 and the second X-ray detector 210, so the detailed description will be omitted.

Further, the arm driving mechanism 4 includes a first arm driving mechanism 204 for driving the first arm 203 and a second arm driving mechanism 212 for driving the second arm 211. The first arm driving mechanism 204 has the same configuration as the arm driving mechanism 4 except that it holds the first arm 203, so the detailed description will be omitted. Further, the second arm driving mechanism 212 has the same configuration as the arm driving mechanism 4 except that it holds the second arm 211, so the detailed description will be omitted.

Further, the X-ray detector moving mechanism 5 includes a first X-ray detector moving mechanism 205 for moving the first X-ray detector 202 forward or backward in the direction of the X-ray irradiation axis 50 (see FIG. 19), and a second X-ray detector moving mechanism 213 for moving the second X-ray detector 210 forward or backward in the direction of the second irradiation axis 53 (see FIG. 19) of X-rays. The first X-ray detector moving mechanism 205 has the same configuration as the X-ray detector moving mechanism 5 except that it moves the first X-ray detector 202, so the detailed description will be omitted. Further, the second X-ray detector moving mechanism 213 has the same configuration as the X-ray detector moving mechanism 5 except that it moves the second X-ray detector 210, so the detailed description will be omitted.

Further, the X-ray imaging apparatus 200 according to the first modification differs from the X-ray imaging apparatus 100 according to the above-described embodiment in that it is equipped with a controller 206 instead of the controller 7.

The controller 206 is configured to select the target position in which the distance of the first X-ray detector 202 to the surface 90c of the subject model 90 is shorter out of the first target position 20 and the second target position 21. Further, the controller 206 is configured to control the first X-ray detector moving mechanism 205 to move the first X-ray detector 202 toward the selected target position. Note that the configuration in which the controller 206 moves the first X-ray detector 202 toward the selected target position is the same as the configuration in which the controller 7 moves the X-ray detector 2 to the selected target position according to the first embodiment described above, so the detailed description will be omitted.

Further, the controller 206 according to the first modification differs from the controller 7 according to the above-described embodiment in that it has a distance acquisition unit 206a and a model update unit 206b instead of the distance acquisition unit 7a and the model update unit 7b.

The distance acquisition unit 206a is configured to further acquire a third distance 35 (see FIG. 20) and a fourth distance 36 (see FIG. 21) in addition to the first distance 30 (see FIG. 4) and the second distance 31 (see FIG. 5).

The model update unit 206b is configured to update the subject model 90 when the first X-ray detector 202 is placed inside the subject model 90 or when the first X-ray detector 202 comes into contact with the subject 80. Further, the model update unit 206b is configured to update the subject model 90 when the second X-ray detector 210 is placed inside the subject model 90 or when the second X-ray detector 210 comes into contact with the subject 80.

Further, the X-ray imaging apparatus 200 according to the first modification is equipped with a storage unit 207. The storage unit 207 has the same configuration as the storage unit 9 except that it stores a plurality of pieces of preset information 270, so the detailed description will be omitted.

The plurality of pieces of preset information 270 includes arm angle information 271 which is information on the angles of the first arm 203 and the second arm 211 and detector position information 272 which is position information on the first X-ray detector 202 and the second X-ray detector 210.

Further, the X-ray imaging apparatus 200 according to the first modification is equipped with a first contact sensor 208 and a second contact sensor 214. The first contact sensor 208 has the same configuration as the contact sensor 10 except that it is provided on the first X-ray detector 202, so the detailed description will be omitted. Further, the second contact sensor 214 has the same configuration as the contact sensor 10 except that it is provided on the second X-ray detector 210, so the detailed description will be omitted.

Further, the X-ray imaging apparatus 200 according to the first modification is equipped with a first arm position changing mechanism 215 and a second arm position changing mechanism 216. The first arm position changing mechanism 215 has the same configuration as the arm position changing mechanism 12 except that it changes the position of the first arm 203, so the detailed description will be omitted. Further, the second arm position changing mechanism 216 is configured to change the position of the second arm 211. The details of the configuration in which the second arm position changing mechanism 216 changes the position of the second arm 211 will be described below.

Figure 19:
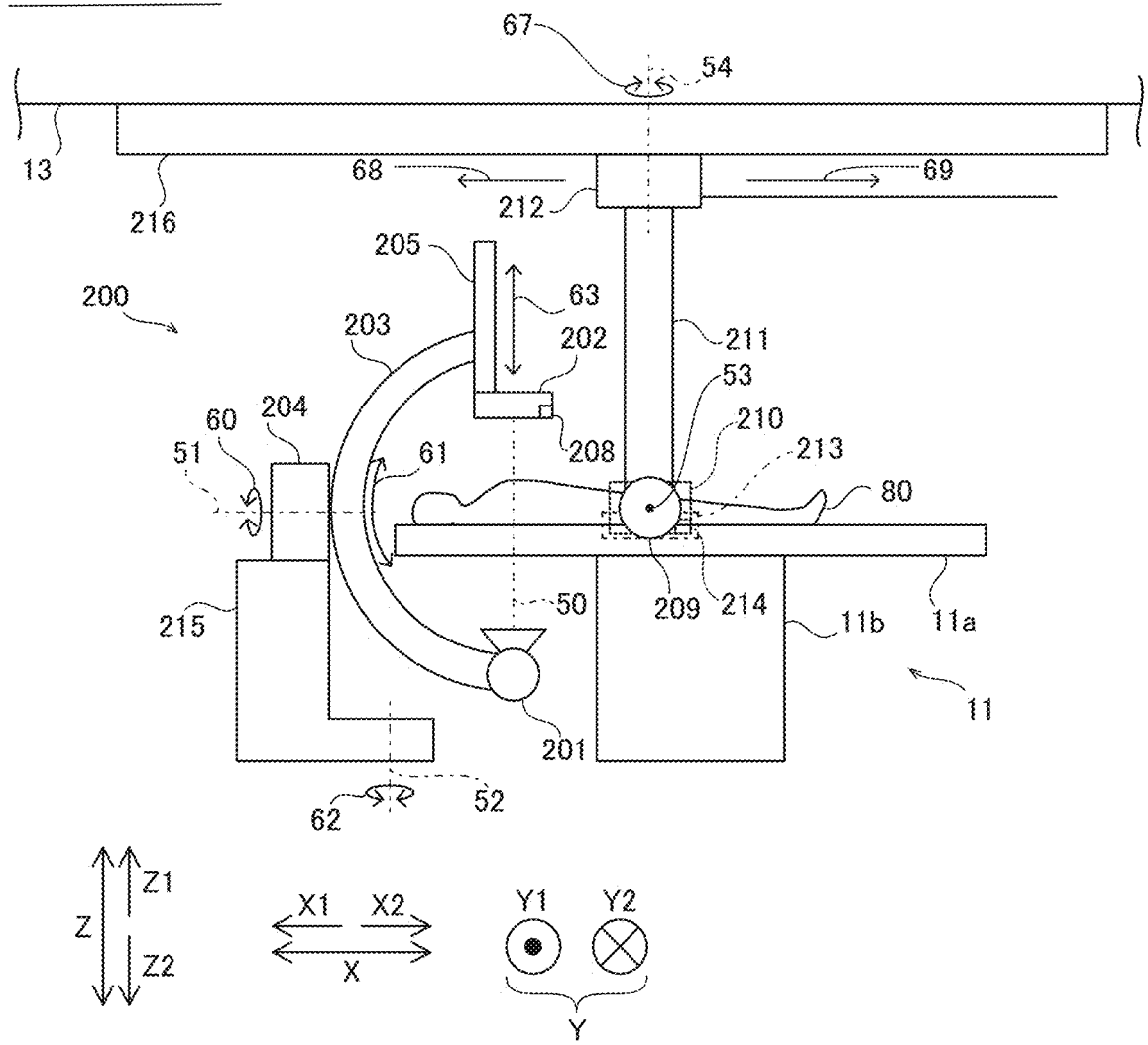
FIG. 19 is a schematic diagram showing a configuration of an X-ray imaging apparatus according to a first modification.

As shown in FIG. 19, the second X-ray detector moving mechanism 213 is configured to move the second X-ray detector 210 in the direction of the second irradiation axis 53 of X-rays. In the example shown in FIG. 19, the second X-ray source 209 and the second X-ray detector 210 are arranged such that the second irradiation axis 53 extends in the Y1-direction.

As shown in FIG. 19, the second arm driving mechanism 212 is provided on the ceiling 13. Specifically, the second arm driving mechanism 212 is provided on the ceiling 13 via the second arm position changing mechanism 216. The second arm driving mechanism 212 is configured to rotate the second arm 211 around the rotation axis 54, as shown by the arrow 67. Note that in the example shown in FIG. 19, the second arm driving mechanism 212 is arranged such that the rotation axis 54 extends vertically (in the Z-direction).

Further, the second arm position changing mechanism 216 is provided on the ceiling 13. The second arm position changing mechanism 216 is configured to move the second arm driving mechanism 212 in the long axis direction of the bed 11 (in the direction of the arrow 68 and in the direction of the arrow 69). The second arm position changing mechanism 216 includes a linear motion mechanism.

Figure 20:
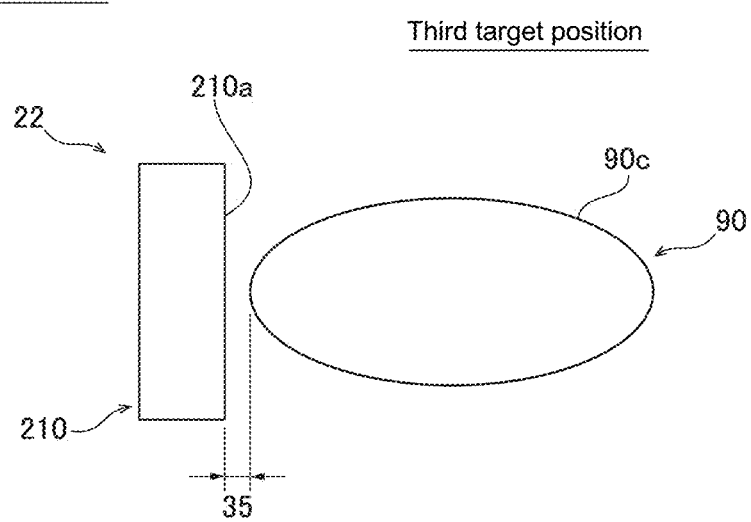
FIG. 20 is a schematic diagram for explaining a third target position according to a first modification.

FIG. 20 is a schematic diagram showing a third target position 22. The third target position 22 is a target position of the second X-ray detector 210 to be set based on the position of the subject model 90. Specifically, the third target position 22 is a position where the surface 210a of the second X-ray detector 210 facing the subject 80 (see FIG. 2) comes into close contact with the surface 90c of the subject model 90. Further, the distance between the surface 210a of the second X-ray detector 210 facing the subject 80 (see FIG. 2) and the surface 90c of the subject model 90 is a third distance 35.

Figure 21:
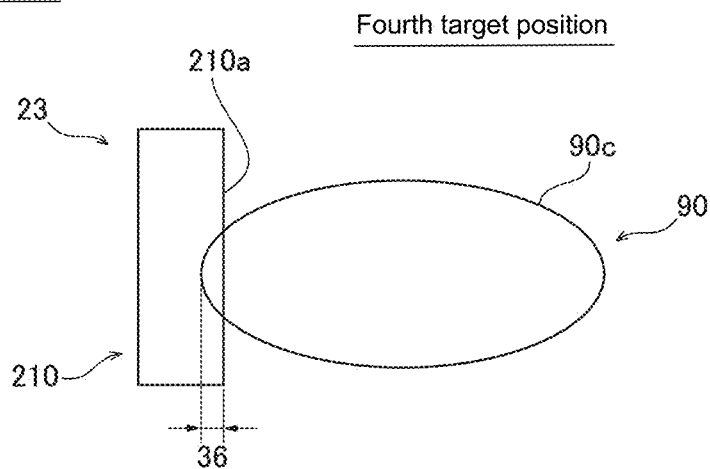
FIG. 21 is a schematic diagram for explaining a fourth target position according to a first modification.

FIG. 21 is a schematic diagram showing a fourth target position 23. The fourth target position 23 is a preset position of the second X-ray detector 210. Specifically, it is a position of the second X-ray detector 210 to be set by the arm angle information 271 (see FIG. 18) and the detector position information 272 (see FIG. 18) included in the preset information 70 (see FIG. 18) selected by the operator. In the example shown in FIG. 21, the second X-ray detector 210 is positioned inside the subject model 90. In other words, the surface 210a of the second X-ray detector 210 is positioned at a position closer to the surface of the subject model 90 than the surface 90c of the subject model 90. Note that the distance between the surface 210a of the second X-ray detector 210 and the surface 90c of the subject model 90 is a fourth distance 36.

The controller 206 (see FIG. 18) according to the first modification is configured to select a target position where the distance of the second X-ray detector 210 to the surface 90c of the subject model 90 is shorter, out of the third target position 22 (see FIG. 20) which is the target position of the second X-ray detector 210 to be set based on the position of the subject model 90 and the fourth target position 23 which is the target position of the second X-ray detector 210 set beforehand. Further, the controller 206 is configured to control the second X-ray detector moving mechanism 213 to move the second X-ray detector 210 toward the selected target position.

Specifically, the controller 206 is configured to compare the third distance 35 (see FIG. 20) and the fourth distance 36. In the case where the third distance 35 is shorter than the fourth distance 36, the controller 206 controls the second X-ray detector moving mechanism 213 to move the second X-ray detector 210 toward the third target position 22 (see FIG. 20). Further, in the case where the fourth distance 36 is shorter than the third distance 35, the controller 206 controls the second X-ray detector moving mechanism 213 to move the second X-ray detector 210 toward the fourth target position 23.

Next, referring to FIG. 22, the processing of setting the target position when the controller 206 (see FIG. 18) moves the first X-ray detector 202 (see FIG. 18) and the second X-ray detector 210 (see FIG. 18) according to the first modification will be described. Note that the same configuration as the processing in which the controller 7 sets the target position of the X-ray detector 2 according to the above embodiment is assigned by the same reference symbol, and the detailed descriptions will be omitted.

In Step 102a to Step 102g, the controller 206 sets, as the target position of the first X-ray detector 202, the target position in which the distance between the first X-ray detector 202 and the surface 90c (see FIG. 4) of the subject model 90 (see FIG. 4) is shorter out of the first target position 20 (see FIG. 4) and the second target position 21 (see FIG. 5).

In Step 102h, the controller 206 acquires the third target position 22 (see FIG. 20). Specifically, the controller 206 acquires the arm angle information 271 (see FIG. 18) included in the preset information 270 (see FIG. 18) selected by the operator, and acquires, as the third target, the position where the second X-ray detector 210 is brought into close contact with the subject model 90 from the angle of the second arm 211 based on the acquired arm angle information 71.

In Step 102i, the controller 206 acquires a fourth target position 23 (see FIG. 21). Specifically, the controller 206 acquires, as the fourth target position 23, the position of the second X-ray detector 210 based on the arm angle information 271 and the detector position information 272 (see FIG. 18) included in the preset information 270 selected by the operator.

In Step 102j, the distance acquisition unit 206a (see FIG. 18) acquires the third distance 35 (see FIG. 20). Specifically, the distance acquisition unit 206a acquires, as the third distance 35, the distance from the surface 210a (see FIG. 20) of the second X-ray detector 210 to the surface 90c (see FIG. 20) of the subject model 90 when assuming that the second X-ray detector 210 is placed at the third target position 22.

In Step 102k, the distance acquisition unit 206a acquires the fourth distance 36 (see FIG. 21). Specifically, the distance acquisition unit 206a acquires, as the fourth distance 36, the distance from the surface 210a of the second X-ray detector 210 to the surface 90c of the subject model 90, when assuming that the second X-ray detector 210 is placed at the fourth target position 23.

In Step 102l, the controller 206 determines whether the third distance 35 is shorter than the fourth distance 36. When the third distance 35 is shorter than the fourth distance 36, the processing proceeds to Step 102m. When the third distance 35 is longer than the fourth distance 36, the processing proceeds to Step 102n. That is, when the fourth distance 36 is shorter than the third distance 35, the processing proceeds to Step 102n.

In Step 102m, the controller 206 sets the third target position 22 as the target position of the second X-ray detector 210. Thereafter, the processing is terminated.

Further, when the processing has proceeded from Step 102l to Step 102n, in Step 102n, the controller 206 sets the fourth target position 23 as the target position of the second X-ray detector 210. Thereafter, the processing is terminated.

Note that either the processing of Step 102a to Step 102g or the processing of Step 102h to Step 102n may be performed first.

Note that the other configurations of the X-ray imaging apparatus 200 according to the first modification are the same as those of the X-ray imaging apparatus 100 according to the above embodiment.

In the first modification, as described above, the X-ray source 1 includes the first X-ray source 201 and the second X-ray source 209. The X-ray detector 2 includes the first X-ray detector 202 for detecting X-rays emitted from the first X-ray source 201 and the second X-ray detector 210 for detecting X-rays emitted from the second X-ray source 209. The arm 3 includes the first arm 203 for holding the first X-ray source 201 and the first X-ray detector 202 and the second arm 211 for holding the second X-ray source 209 and the second X-ray detector 210. The arm driving mechanism 4 includes the first arm driving mechanism 204 for driving the first arm 203 and the second arm driving mechanism 212 for driving the second arm 211. The X-ray detector moving mechanism 5 includes the first X-ray detector moving mechanism 205 for moving the first X-ray detector 202 forward or backward in the direction of the irradiation axis 50 of X-rays, and the second X-ray detector moving mechanism 213 for moving the second X-ray detector 210 forward or backward in the direction of the irradiation axis (second irradiation axis 53) of X-rays. The controller 206 selects a target position in which the distance of the first X-ray detector 202 to the surface 90c of the subject model 90 is small, out of the first target position 20 and the second target position 21, and controls the first X-ray detector moving mechanism 205 to perform the control to move the first X-ray detector 202 toward the selected target position, select the target position in which the distance of the second X-ray detector 210 to the surface 90c of the subject model 90 is small, out of the third target position 22 which is the target position of the second X-ray detector 210 to be set based on the position of the subject model 90 and the fourth target position 23 which is the target position of the second X-ray detector 210 set in advance, and control the second X-ray detector moving mechanism 213 to thereby perform the control to move the second X-ray detector 210 toward the selected target position.

With this, it is possible to position both the first X-ray detector 202 and the second X-ray detector 210 in close proximity to the subject 80. As a result, in a so-called biplane imaging apparatus with the first arm 203 and the second arm 211, by applying the present invention, it is possible to prevent the increase in the operator's workload while preventing both the first X-ray detector 202 and the second X-ray detector 210 from being away from the subject 80.

Note that the other effects of the X-ray imaging apparatus 200 according to the first modification are the same as those of the X-ray imaging apparatus 100 according to the above embodiment.

(Second Modification)

Figure 23:
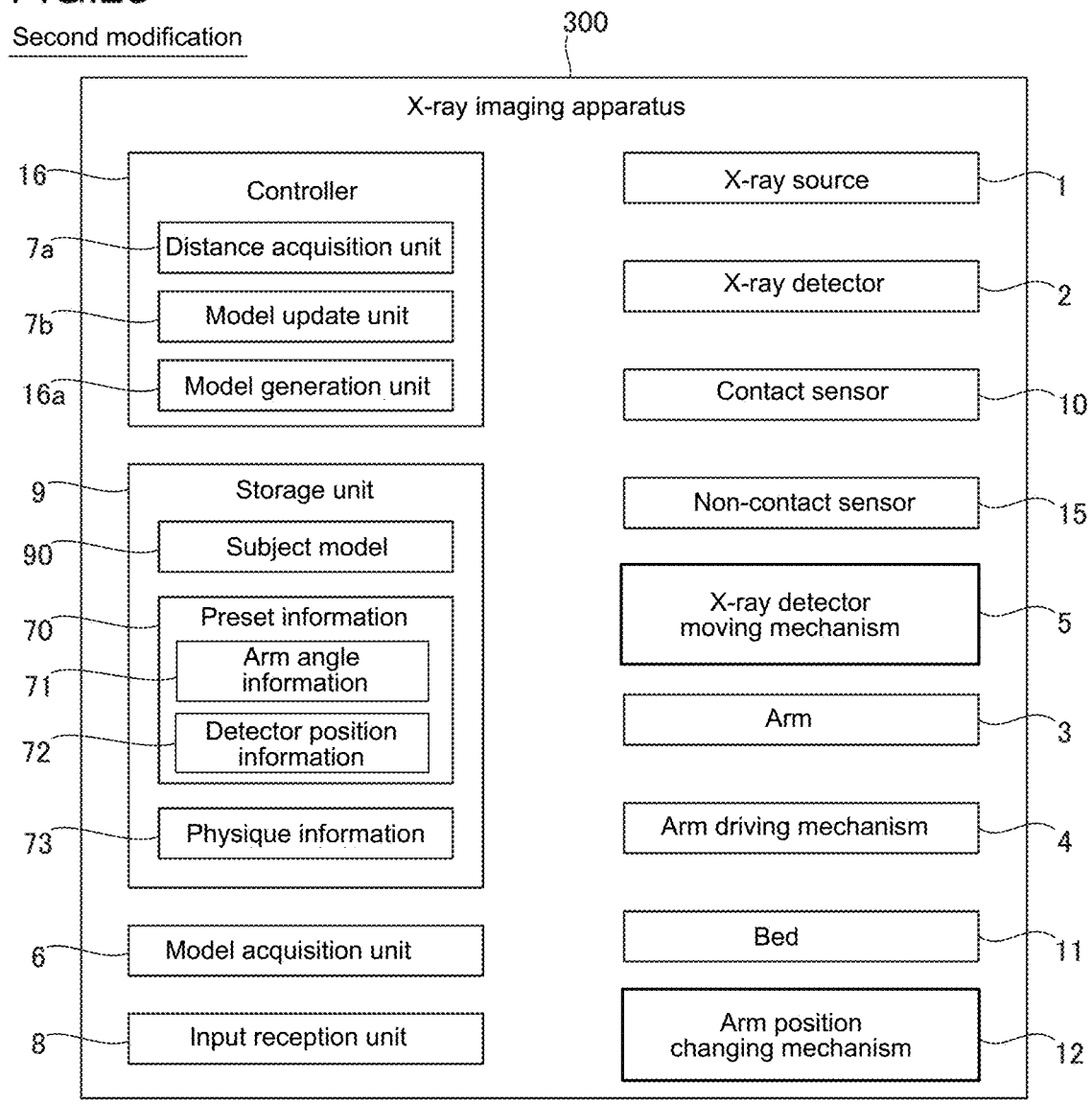
FIG. 23 is a block diagram showing an overall configuration of an X-ray imaging apparatus according to a second modification.

In this embodiment above, an example is shown in which the X-ray imaging apparatus 100 is equipped with the model acquisition unit 6 for acquiring the subject model 90 stored in the hospital system server (not shown), electronic medical record system (not shown), etc., of the hospital where the X-ray imaging apparatus 100 is installed, but the present invention is not limited thereto. For example, it may be configured to generate a subject model 90, as in the X-ray imaging apparatus 300 according to the second modification shown in FIG. 23. As shown in FIG. 23, the X-ray imaging apparatus 300 according to the second modification differs from the X-ray imaging apparatus 100 according to the above-described embodiment in that it has a non-contact sensor 15 and a controller 16 instead of the controller 7.

Figure 24:
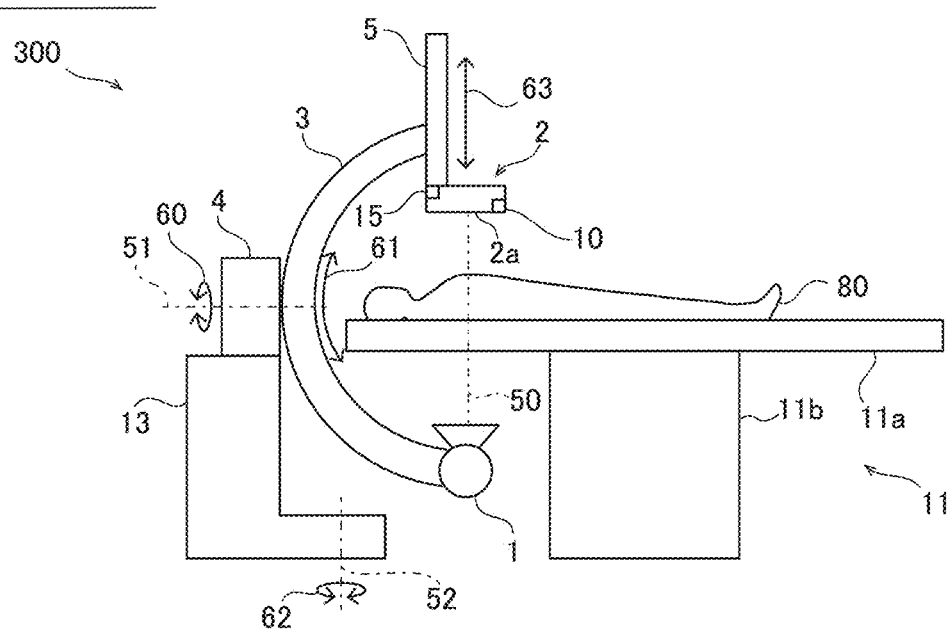
FIG. 24 is a schematic diagram showing a configuration of an X-ray imaging apparatus according to a second modification.

As shown in FIG. 24, the non-contact sensor 15 is configured to acquire the physique information 73 which is information about the physique of the subject 80 placed on the bed 11. The non-contact sensor 15 is configured to acquire, as the physique information 73, three-dimensional data of the surface shape of the subject 80, including the body thickness 80a (see FIG. 3) and the body width 80b (see FIG. 3). The non-contact sensor 15 includes, for example, an infrared sensor, a LiDAR (Light Detection and Ranging) sensor, etc.

Further, the non-contact sensor 15 is provided at a position where it is possible to obtain the physique information 73 (see FIG. 1) on the subject 80. Specifically, the non-contact sensor 15 is attached to the X-ray detector 2 on the rear side (Z1-direction side) of the surface 2a.

Furthermore, as shown in FIG. 23, the controller 16 according to the second modification differs from the controller 7 according to the above-described embodiment in that it has a model generation unit 16a. The model generation unit 16a is configured by software as a functional block realized by the controller 16 executing various programs stored in the storage unit 9. The model generation units 16a may be configured by mutually separate hardware by providing dedicated processors (processing circuitries).

The model generation unit 16a is configured to generate the subject model 90. Specifically, the model generation unit 16a is configured to generate the subject model 90 based on the physique information 73 on the subject 80. In the second modification, the model generation unit 16a is configured to generate the subject model 90 based on the information on the subject 80 acquired by the non-contact sensor 15. In other words, the model generation unit 16a is configured to generate the subject model 90 based on the physique information 73 on the subject 80 acquired by the non-contact sensor 15. Note that the physique information 73 on the subject 80 is acquired by the non-contact sensor 15 and stored in the storage unit 9.

Note that the other configurations of the X-ray imaging apparatus 300 according to the second modification are the same as those of the X-ray imaging apparatus 100 according to the first embodiment described above.

In the second modification, as described above, it is provided with the bed 11 on which the subject 80 is placed, the non-contact sensor 15 for acquiring physique information 73 which is information on the physique of the subject 80 placed on the bed 11, and the model generation unit 16a for generating the subject model 90 based on the information on the subject 80 acquired by the non-contact sensor 15. With this, it is possible to accurately acquire the information on the body thickness 80a and the body width 80b of the subject 80 by the non-contact sensor 15. As a result, it is possible to easily generate the subject model 90 with improved accuracy of the thickness 90a and the width 90b.

Note that the other effects of the X-ray imaging apparatus 300 according to the second modification are the same as those of the X-ray imaging apparatus 100 according to the embodiment described above.

(Third Modification)
(Configuration of X-Ray Imaging Apparatus)

Next, referring to FIG. 25, the configuration of an X-ray imaging apparatus 400 according to a third modification will be described. In the third modification, the controller 406 is configured to perform processing different in setting the target position when moving the X-ray detector between the X-ray detector performing X-ray imaging and the X-ray detector not performing X-ray imaging. Note that the same configuration as in the first modification described above is assigned by the same reference symbol, and the description will be omitted.

Figure 25:
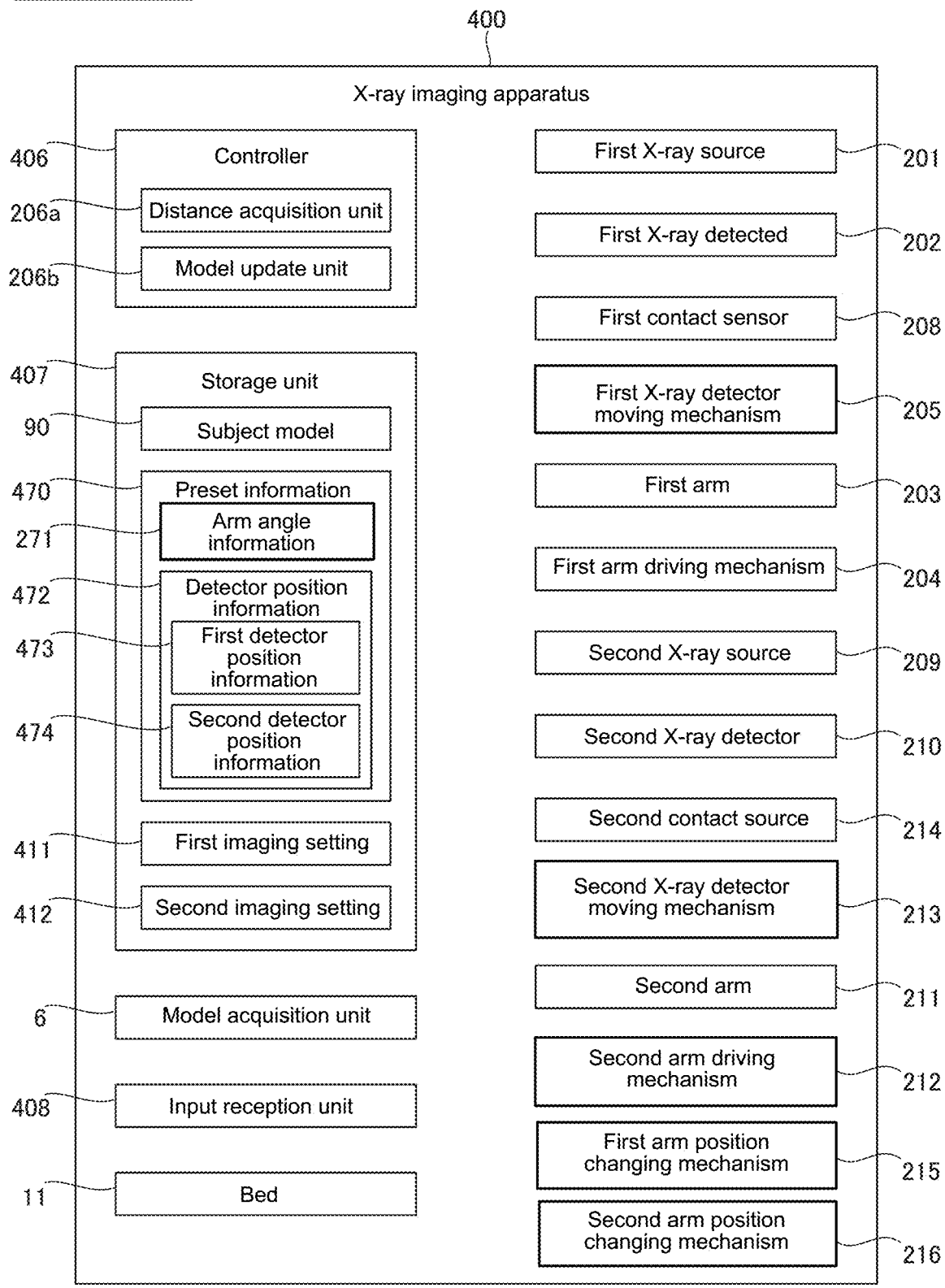
FIG. 25 is a schematic diagram showing a configuration of an X-ray imaging apparatus according to a third modification.

As shown in FIG. 25, the X-ray imaging apparatus 400 according to the third modification differs from the X-ray imaging apparatus 200 according to the first modification described above in that it has a controller 406 instead of the controller 206.

The controller 406 performs the first X-ray imaging by the first X-ray source 201 and the first X-ray detector 202, compares the first target position 20 (see FIG. 4) which is the target position of the first X-ray detector 202 set based on the position of the subject model 90 and the second target position 21 (see FIG. 5) which is a preset target position of the first X-ray detector 202, in moving the first X-ray detector 202 when not performing the second X-ray source 209 and the second X-ray detector 210, selects a target position in which the distance of the first X-ray detector 202 to the surface 90c of the subject model 90 is small, out of the first target position 20 and the second target position 21, and controls the first X-ray detector moving mechanism 205 to perform the control to move the first X-ray detector 202 toward the selected target position.

Note that in the above case, the configuration in which the controller 406 moves the first X-ray detector 202 toward the selected target position is the same as the configuration in which the controller 206 moves the X-ray detector 202 to the selected target position according to the first modification described above, so the detailed description will be omitted.

When performing the first X-ray imaging described above but not performing the second X-ray imaging, the controller 406 controls, in moving the second X-ray detector 210, the second X-ray detector moving mechanism 213 to perform the control to move the second X-ray detector 210 toward the fourth target position 23, without comparing the third target position 22 (see FIG. 20) which is the target position of the second X-ray detector 210 set based on the position of the subject model 90 and the preset fourth target position 23 (see FIG. 21) which is the preset fourth target position 23 of the second X-ray detector 210.

In other words, in the above case, in moving the second X-ray detector 210, the controller 406 compares the third target position 22 and the fourth target position 23, to perform the control to move the second X-ray detector 210 toward the fourth target position 23, without performing the control to select a target position where the distance of the second X-ray detector 210 to the surface 90c of the subject model 90 is smaller, out of the third target position 22 and the fourth target position 23.

Furthermore, similarly, when performing the second X-ray imaging but not performing the first X-ray imaging, the controller 406 is configured to compare the third target position 22 (see FIG. 20) and the fourth target position 23 (see FIG. 21), select the target position where the distance of the second X-ray detector 210 with respect to the surface 90c of the subject model 90 is shorter, out of the third target position 22 and the fourth target position 23 to perform the control to move the second X-ray detector 210 toward the selected target position.

Note that in the above case, the configuration in which the controller 406 moves the second X-ray detector 210 toward the selected target position is the same as the configuration in which the controller 206 moves the second X-ray detector 210 to the selected target position according to the first modification described above, so the detailed description will be omitted.

When performing the above-described second X-ray imaging but not performing the above-described first X-ray imaging, the controller 406 controls the first X-ray detector moving mechanism 205 without comparing the first target position 20 (see FIG. 4) and the second target position 21 (see FIG. 5) in moving the first X-ray detector 202 to thereby perform the control to move the first X-ray detector 202 toward the second target position 21.

In other words, in the above case, the controller 406 compares the first target position 20 and the second target position 21 in moving the first X-ray detector 202 and performs the control to move the first X-ray detector 202 toward the second target position 21 without performing the control to select the target position where the distance of the first X-ray detector 202 to the surface 90c of the subject model 90 is smaller, out of the first target position 20 and the second target position 21.

Further, the X-ray imaging apparatus 400 according to the third modification is equipped with a storage unit 407. The storage unit 407 has the same configuration as the storage unit 207 according to the first modification described above, except that it stores a plurality of pieces of preset information 470 including the first detector position information 473 and the second detector position information 474, the first imaging setting 411, and the second imaging setting 412, so the detailed description will be omitted.

The plurality of pieces of preset information 470 includes the arm angle information 271 which is information on the angles of the first arm 203 and the second arm 211 and the detector position information 472 which is position information on the first X-ray detector 202 and the second X-ray detector 210. The detector position information 472 includes the first detector position information 473 which is the position information on the first X-ray detector 202, and the second detector position information 474 which is the position information on the second X-ray detector 210.

The first imaging setting 411 is the setting of whether or not to perform the first X-ray imaging with the first X-ray source 201 and the first X-ray detector 202. The second imaging setting 412 is the setting of whether or not to perform the second X-ray imaging by the second X-ray source 209 and the second X-ray detector 210. The first imaging setting 411 and the second imaging setting 412 are set by the operator's operational input to the input reception unit 408. The controller 406 is configured to move the first X-ray detector 202 and the second X-ray detector 210 based on the first imaging setting 411 or the second imaging setting 412 set by the operator's operation input to the input reception unit 408.

The first imaging setting 411 and the second imaging setting 412 may be set by the operator before or after the selection of the preset information 470 by the operator, or at the time of selecting the preset information 470 by the operator, or they may be pre-set so as to be associated with each of the plurality of pieces of preset information 470 by the operator's operational input.

Further, the X-ray imaging apparatus 400 according to the third modification is equipped with an input reception unit 408. The input reception unit 408 has the same configuration as the input reception unit 8 according to the first modification described above except that it is configured to accept the operator's operational input regarding the first imaging setting 411 and the second imaging setting 412, so the detailed description will be omitted.

In the operation input at the input reception unit 408 regarding the first imaging setting 411 and the second imaging setting 412, as an example, the operator can set the first imaging setting 411 and the second imaging setting 412 by selecting one of the following modes: a mode in which only the first x-ray imaging is performed and no second x-ray imaging is performed, a mode in which only the second x-ray imaging is performed without performing the first x-ray imaging, or a mode in which both the first x-ray imaging and the second X-ray imaging are performed.

Note that the setting methods in the input reception unit 408 for the first imaging setting 411 and the second imaging setting 412 are not limited to the methods described above. As another example, in the operation input at the input reception unit 408 regarding the first imaging setting 411 and the second imaging setting 412, it may be configured such that the operator sets the first imaging setting 411 by selecting either to perform the first imaging or not to perform the first imaging, and the second imaging setting 412 by selecting either to perform the second imaging or not to perform the second imaging.

The first X-ray source 201 and the first X-ray detector 202, and the second X-ray source 209 and the second X-ray detector 210 are configured to allow X-ray imaging from different angles to one imaging site. Even in the case where X-ray imaging is performed by only one of the first X-ray source 201 and the first X-ray detector 202 or the second X-ray source 209 and the second X-ray detector 210, it is configured to automatically change the position and the angle of both the first arm 203 and the second arm 211, based on the arm angle information 271 included in the preset information 470 selected by the operator. That is, even in the case where X-ray imaging is performed by only one of the them, both the first arm 203 and the second arm 211 are configured to be moved.

With this, it is possible to suppress the interference between the first X-ray source 201, the first X-ray detector 202, and the first arm 203, and the second X-ray source 209, the second X-ray detector 210, and the second arm 211, caused by the movement of one of them and the non-movement of the other, when X-ray imaging is performed by only one of them.

Here, in the case where X-ray imaging is performed by only one of the first X-ray source 201 and the first X-ray detector 202, or the second X-ray source 209 and the second X-ray detector 210, based on the first imaging setting 411 and the second imaging setting 412, there is no need to position the other X-ray detector not performing X-ray imaging at a position closer to the subject 80 (FIG. 19).

Therefore, in the case where one of the plurality of pieces of preset information 470 is selected based on the operator's operation input, it is set to perform the first X-ray imaging in the first imaging setting 411, and it is set not to perform the second X-ray imaging in the second imaging setting 412, the controller 406 is configured to acquire, as the fourth target position 23, the second detector position information 474 included in the detector position information 472 in the selected preset information 470, without comparing the third target position 22 and the fourth target position 23, and move the second X-ray detector 210 toward the fourth target position 23.

Furthermore, in the case where one of the plurality of pieces of preset information 470 is selected based on the operator's operation input, it is set not to perform the first X-ray imaging in the first imaging setting 411 and perform the second X-ray imaging in the first imaging setting 411, the controller 406 is configured to acquire, as the second target position 21, the first detector position information 473 included in the detector position information 472 in the selected preset information 470 without comparing the first target position 20 and the second target position 21, and move the first X-ray detector 202 toward the second target position 21.

(Imaging Processing of Subject)

Next, referring to FIG. 26, the processing of imaging the subject 80 by the X-ray imaging apparatus 400 according to a third modification will be described. Note that the same processing as that of the X-ray imaging apparatus 400 according to the first embodiment and the first modification described above in which the subject 80 is imaged by the X-ray imaging apparatus 400 will be assigned by the same reference symbol, and the detailed explanations will be omitted.

In Step 101, the controller 406 acquires preset information 470. In Step 107, the controller 406 acquires a first imaging setting 411 and a second imaging setting 412. Specifically, the controller 406 acquires the first imaging settings 411 regarding whether or not to perform the first X-ray imaging and the second imaging settings 412 regarding whether or not to perform the second X-ray imaging, which are stored in the storage unit 407. Note that either the processing of Step 101 or the processing of Step 107 may be performed first.

In the case of performing both the first imaging and the second imaging based on the first imaging setting 411 and the second imaging setting 412, in Step 102x, the controller 406 sets the target positions of the first X-ray detector 202 and the second X-ray detector 210. When performing the first X-ray imaging and not performing the second X-ray imaging based on the first imaging setting 411 and the second imaging setting 412, in Step 102y, the controller 406 sets the target positions of the first X-ray detector 202 and the second X-ray detector 210. When not performing the first X-ray imaging but performing the second X-ray imaging based on the first imaging setting 411 and the second imaging setting 412, in Step 102z, the controller 406 sets the target positions of the first X-ray detector 202 and the second X-ray detector 210.

The details of processing for setting the target positions for the controller 406 to move the first X-ray detector 202 and the second X-ray detector 210 in Step 102x, Step 102y, and Step 102z will be described later.

In Step 103 to Step 106, the controller 406 moves the first arm 203 and the second arm 211, and the first X-ray detector 202 and the second X-ray detector 210. The model update unit 206b updates the subject model 90. The controller 406 controls the first X-ray source 201 and the first X-ray detector 202, and the second X-ray source 209 and the second X-ray detector 210, based on the first imaging setting 411 and the second imaging setting 412 to image the subject 80. The controller 406 determines whether the preset information 470 has been further selected. By performing the above processing, the X-ray imaging apparatus 400 images the subject 80.

(Moving Processing of First X-Ray Detector and Second X-Ray Detector)

Next, referring to FIG. 22, FIG. 27, and FIG. 28, the processing of setting the target position when the controller 406 according to the third modification moves the first X-ray detector 202 and the second X-ray detector 210 will be described. Note that the same configuration of the processing for the controller 206 to set the target positions of the first X-ray detector 202 and the second X-ray detector 210 will be assigned by the same reference symbol, and the detailed description will be omitted.

Figure 22:
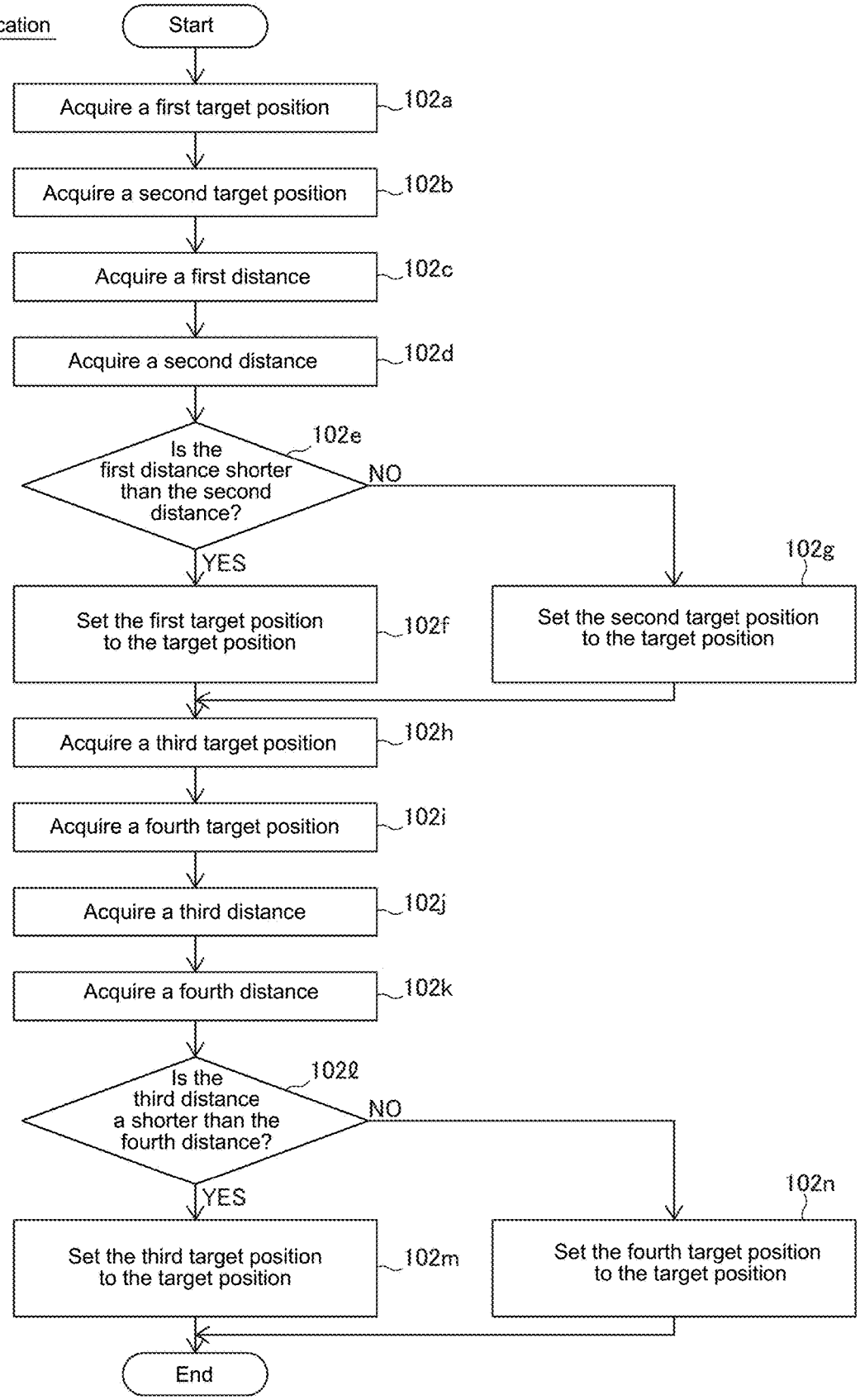
FIG. 22 is a flowchart for explaining the processing in which a controller sets a target position of an X-ray detector according to the first modification.
Figure 26:
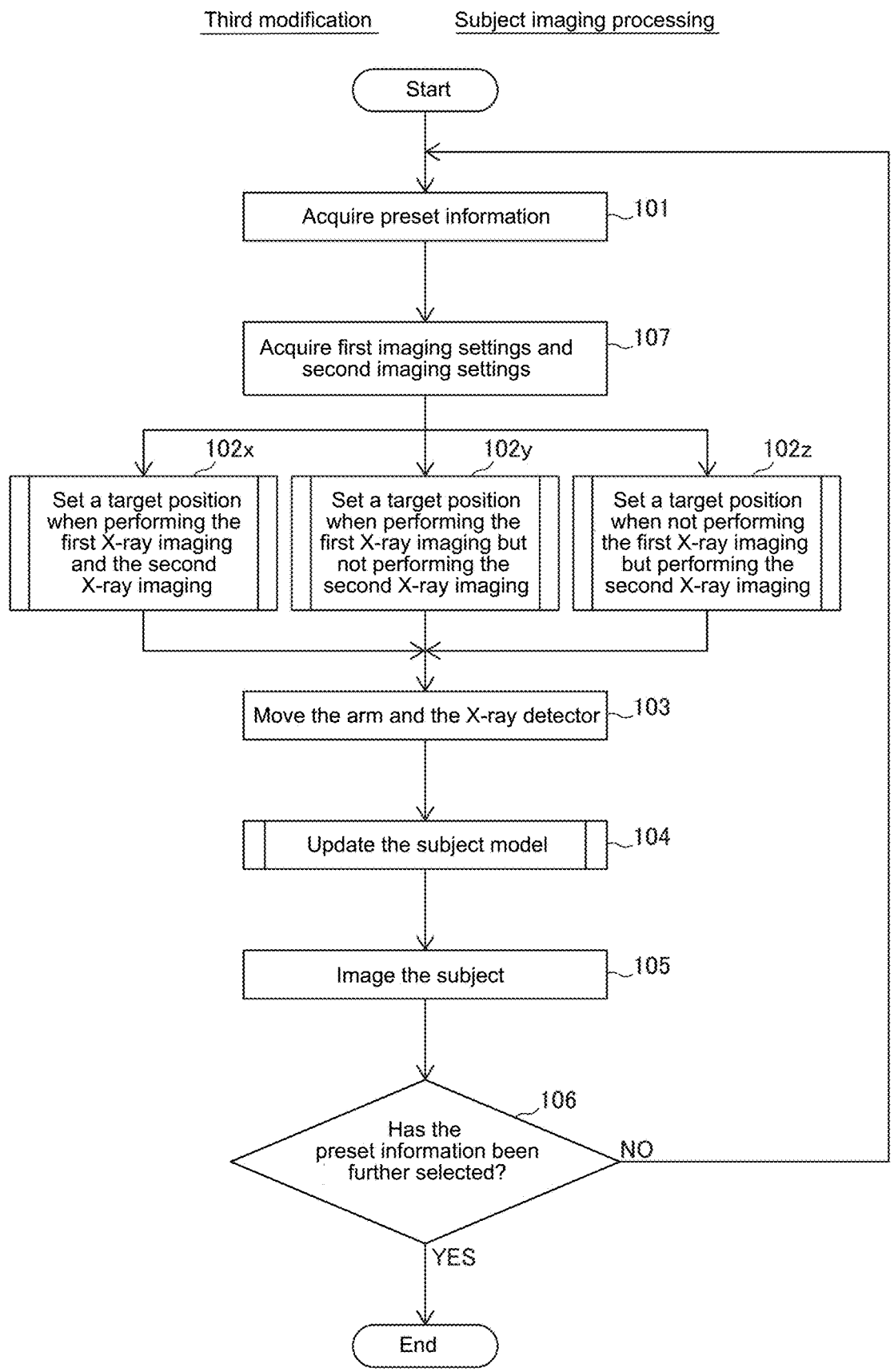
FIG. 26 is a flowchart for explaining the processing of imaging a subject by an X-ray imaging apparatus according to a third modification.

In the case of Step 102x shown in FIG. 26, the controller 406 performs the same processing as in Step 102a to Step 102n shown in FIG. 22. That is, in the third modification, when performing both the first X-ray imaging and the second imaging based on the first imaging setting 411 and the second imaging setting 412, in Step 102x, the controller 406 sets the target positions of the first X-ray detector 202 and the second X-ray detector 210 by performing the similar processing as the processing in Steps 102a to Step 102n shown in FIG. 22 in the first modification.

Specifically, the controller 406 sets, as the target position of the first X-ray detector 202, the target position where the distance between the first X-ray detector 202 and the surface 90c of the subject model 90 is shorter in the first X-ray detector 202, out of the first target position 20 and the second target position 21. Further, the controller 406 sets, as the target position of the second X-ray detector 210, the target position where the distance between the second X-ray detector 210 and the surface 90c of the subject model 90 is shorter in the second X-ray detector, out of the third target position 22 and the fourth target position 23. Thereafter, the processing is terminated.

Figure 27:
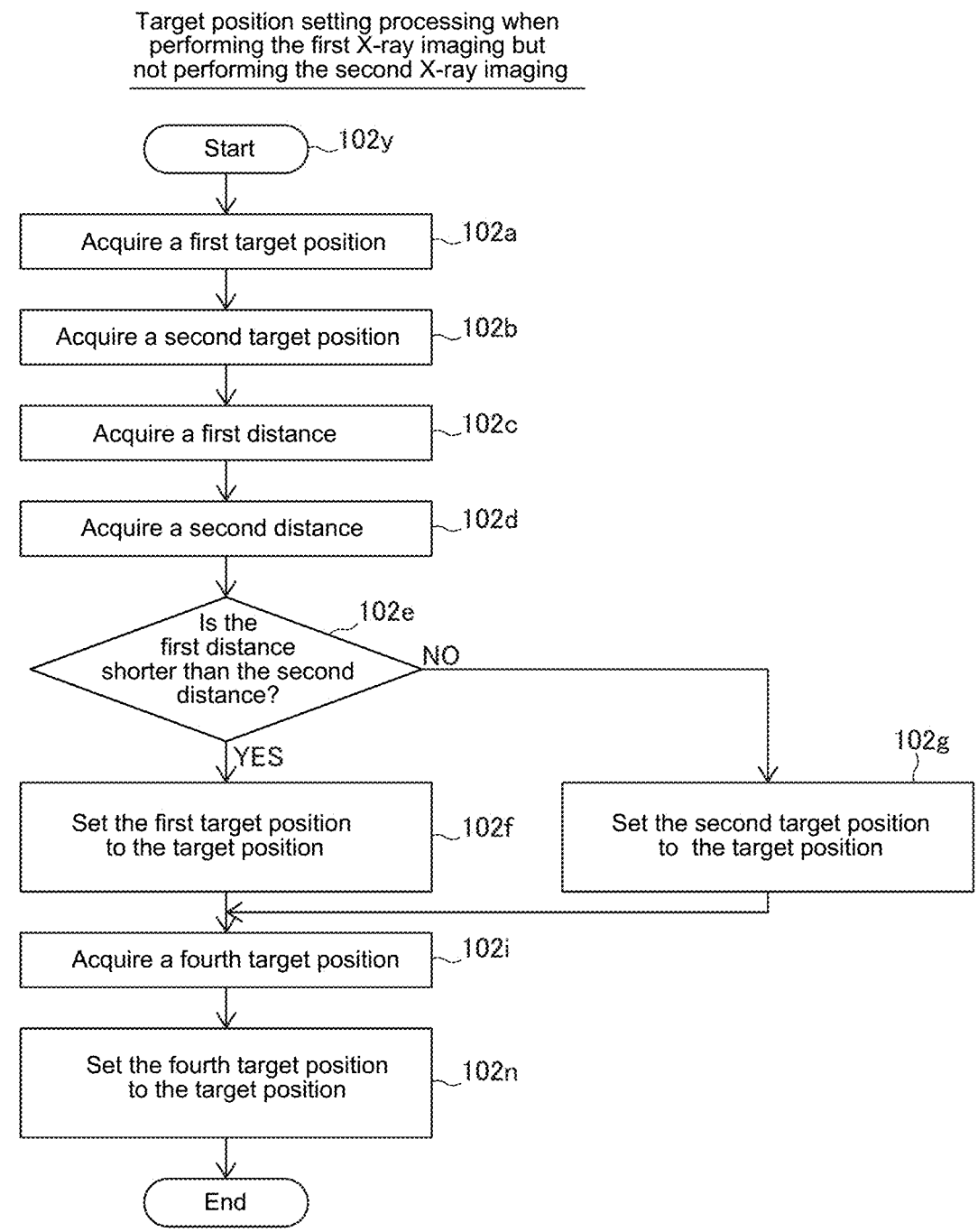
FIG. 27 is a first flowchart for explaining the processing in which the X-ray imaging apparatus sets a target position of an X-ray detector according to a third modification.

Furthermore, in the case of Step 102y shown in FIG. 26, the controller 406 performs the processing in Step 102a and Step 102g shown in FIG. 27, and the processing in Step 102i to Step 102n. That is, in the third modification, when performing the first X-ray imaging and not performing the second X-ray imaging based on the first imaging setting 411 and the second imaging setting 412, in Step 102y (Step 102a to Step 102g, Step 102i to Step 102n), the controller 406 sets the target positions of the first X-ray detector 202 and the second X-ray detector 210.

In Step 102a to Step 102g shown in FIG. 27, the controller 406 sets, as the target position of the first X-ray detector 202, the target position where the distance between the first X-ray detector 202 and the surface 90c of the subject model 90 in the first X-ray detector 202, out of the first target position 20 and the second target position 21, based on the first imaging setting 411 set to perform the first X-ray imaging.

In Step 102i, the controller 406 acquires the fourth target position 23. Specifically, the controller 406 acquires, as the fourth target position 23, the position of the second X-ray detector 210 based on the arm angle information 271 and the second detector position information 474 included in the preset information 470 selected by the operator, based on the second imaging setting 412 set not to perform the second X-ray imaging.

In Step 102n, the controller 406 sets the fourth target position 23 as the target position of the second X-ray detector 210. Thereafter, the processing is terminated.

Note that either the processing of Step 102a to Step 102g or the processing of Step 102i and Step 102n may be performed first.

Furthermore, in the case of Step 102z shown in FIG. 26, the controller 406 performs the processing in Step 102b and Step 102g shown in FIG. 28, and the processing in Step 102h to Step 102*n*. That is, in the third modification, when not performing the first X-ray imaging and performing the second X-ray imaging based on the first imaging setting 411 and the second imaging setting 412, in Step 102*z* (Step 102*b*, Step 102*g*, and Step 102*h* to Step 102*n*), the controller 406 sets the target positions of the first X-ray detector 202 and the second X-ray detector 210.

In Step 102*b* shown in FIG. 28, the controller 406 acquires the second target position 21. Specifically, the controller 406 acquires, as the second target position 21, the position of the first X-ray detector 202 based on the arm angle information 271 and the first detector position information 473 included in the preset information 470 selected by the operator, based on the first imaging setting 411 set not to perform the first X-ray imaging.

In Step 102*g*, the controller 406 sets the second target position 21 as the target position of the X-ray detector 202.

In Step 102*h* to Step 102*n*, the controller 406 sets, as the target position of the second X-ray detector 210, the distance between the second X-ray detector 210 and the surface 90*c* of the subject model 90, out of the third target position 22 and the fourth target position 23, based on the second imaging setting 412 set to perform the second X-ray imaging. Thereafter, the processing is terminated.

Note that either the processing of Step 102*b* and Step 102*g* or the processing of Steps 102*h* to 102*n* may be performed first.

Note that the other configurations of the X-ray imaging apparatus 400 according to the third modification are the same as those of the X-ray imaging apparatus 200 according to the first modification described above.

(Effects of Third Modification)

In the third modification, as described above, the X-ray source includes the first X-ray source 201 and the second X-ray source 209. The X-ray detector includes the first X-ray detector 202 for detecting X-rays emitted from the first X-ray source 201 and the second X-ray detector 210 for detecting X-rays emitted from the second X-ray source 209. The arm includes the first arm 203 for holding the first X-ray source 201 and the first X-ray detector 202 and the second arm 211 for holding the second X-ray source 209 and the second X-ray detector 210. The arm driving mechanism includes the first arm driving mechanism 204 for driving the first arm 203 and the second arm driving mechanism 212 for driving the second arm 211. The X-ray detector moving mechanism includes the first X-ray detector moving mechanism 205 for moving the first X-ray detector 202 forward or backward in the X-ray irradiation axis direction and the second X-ray detector moving mechanism 213 for moving the second X-ray detector 210 forward or backward in the X-ray irradiation axis direction. When performing X-ray imaging by the first X-ray source 201 and the first X-ray detector 202 and not performing X-ray imaging by the second X-ray source 209 and the second X-ray detector 210, The controller 406 compares the first target position 20 and the second target position 21 in moving the first X-ray detector 202 to select a target position where the distance of the first X-ray detector 202 to the surface 90*c* of the subject model 90 is shorter, out of the first target position 20 and the second target position 21, controls the first X-ray detector moving mechanism 205 to perform the control to move the first X-ray detector 202 toward the selected target position, and controls the second X-ray detector moving mechanism 213 without comparing the third target position 22 which is the target position of the second X-ray detector 210 set based on the position of the subject model 90 and the fourth target position 23 which is the preset target position of the second X-ray detector 210, in moving the second X-ray detector 210, to perform the control to move the second X-ray detector 210 toward the fourth target position 23.

Here, in general, the distance of the first X-ray detector 202 to the surface 90*c* of the subject model 90 is greater at the fourth target position 23 than at the third target position 22. Therefore, in a so-called biplane X-ray imaging apparatus with the first arm 203 and the second arm 211, the controller 406 moves the second X-ray detector 210, which is not used for X-ray imaging, toward the fourth target position 23 without comparing the third target position 22 and the fourth target position 23.

With this, it is possible to suppress the control of the movement of the second X-ray detector 210, which is not used for imaging X-rays, from becoming too complicated. Furthermore, the second X-ray detector 210 which is not used for imaging and has moved toward the fourth target position 23 becomes less likely to interfere with X-ray imaging, thus improving the workability of the X-ray imaging.

Furthermore, in the third modification, as described above, it is further provided with the input reception unit 408 for accepting the operator's operation input concerning the first imaging setting 411 which is the setting of whether or not to perform X-ray imaging by the first X-ray source 201 and the first X-ray detector 202 and the second imaging setting 412 which is the setting of whether or not to perform X-ray imaging by the second X-ray source 209 and the second X-ray detector 210. The controller 406 is configured to move the first X-ray detector 202 and the second X-ray detector 210 based on the first imaging setting 411 or the second imaging setting 412 set by the operator's operation input to the input reception unit 408.

With this, the first imaging setting 411 and the second imaging setting 412 can be easily set by the operator's operation input to the input reception unit 408, thereby improving the user's convenience (usability).

Furthermore, in the third modification, as described above, it is further provided with: the input reception unit 408 for receiving the operator's operational inputs; and the storage unit 407 for storing the first imaging setting 411 which is a setting of whether or not to perform X-ray imaging by the first X-ray source 201 and the first X-ray detector 202, a second imaging setting 412 which is a setting of whether or not to perform X-ray imaging by the second X-ray source 209 and the second X-ray detector 210, and a plurality of pieces of present information 70 including the first detector position information 473 which is information on the position of the first X-ray detector 202 in the X-ray irradiation axis direction and the second detector position information 474 which is information of the position of the second X-ray detector 210 in the X-ray irradiation axis direction. The controller 406 is configured to acquire, as the fourth target position 23, the second detector position information 474 included in the selected preset information 470 in the case where any one of the plurality of pieces of preset information 470 is selected based on the operator's operation input by the input reception unit 408 and it is set that X-ray imaging by the second X-ray source 209 and the second X-ray detector 210 are not performed in the second imaging setting 412. With this, it is possible to easily move the second X-ray detector 210, which is not used for X-ray imaging, to the predefined fourth target position 23 based on the second detector position information 474.

Note that the other effects of the X-ray imaging apparatus 400 according to the third modification are the same as those of the X-ray imaging apparatus 200 according to the above-described modification.

[Other Modification)]

In the above-described embodiment, a configuration example is shown in which the X-ray imaging apparatus 100 is equipped with the distance acquisition unit 7a, but the present invention is not limited thereto. For example, the X-ray imaging apparatus 100 may not be provided with the distance acquisition unit 7a. In the case where the X-ray imaging apparatus 100 is not equipped with the distance acquisition unit 7a, the controller 7 can be configured to compare the first target position 20 and the second target position 21 based on the position information on the X-ray detector 2 and the position information on the surface 90c of the subject model 90.

Further, in the above-described embodiment, a configuration example is shown in which the controller 7 compares the first target position 20 and the second target position 21 set based on the operator's input, but the present invention is not limited thereto. For example, the controller 7 may be configured to acquire the position information of the arm 3 with respect to the imaging position of the subject 80 from an electronic medical record system or the like and compare the second target position 21 set based on the acquired position information on the arm 3 and the first target position 20.

Furthermore, in this embodiment, a configuration example is shown in which the controller 7 updates the first target position 20 based on the updated subject model 90 when changing the angle of the arm 3, but the present invention is not limited thereto. For example, the controller 7 may be configured to update the first target position 20 based on the updated subject model 90 when the movement of the X-ray detector 2 has been completed.

Furthermore, in this embodiment, the configuration example is shown in which the model update unit 7b updates the subject model 90 when the X-ray detector 2 is placed inside the subject model 90, but the present invention is not limited thereto. For example, the model update unit 7b may be configured to update the subject model 90 based on operator input.

Further, in this embodiment, the configuration example is shown in which the model update unit 7b updates the subject model 90 when the contact between the X-ray detector 2 and the subject 80 is no longer detected by the contact sensor 10 after the contact between the X-ray detector 2 and the subject 80 is detected by the contact sensor 10. For example, the model update unit 7b may be configured to update the subject model 90 based on operator input.

Further, in the above-described second modification, the configuration example is shown in which the model generation unit 16a generates the subject model 90 based on the physique information 73 on the subject 80 acquired by the non-contact sensor 15, but the present invention is not limited thereto. For example, the model generation unit 16a may be configured to generate the subject model 90 based on the physique information 73 on the subject 80 stored in the hospital system server (not shown) or electronic medical record system (not shown) of the hospital where the X-ray imaging apparatus 100 is installed. Further, the model generation unit 16a may be configured to generate the subject model 90 based on the body thickness 80a and the body width 80b of the subject 80, which are estimated from the height and the weight of the subject 80.

Further, the model generation unit 16a may be configured to generate the subject model 90 based on the position of the X-ray detector 2 when the X-ray detector 2 and the subject 80 come into contact with each other by the contact sensor 10. In other words, the model generation unit 16a may be configured to acquire the body thickness 80a and the body width 80b of the subject 80 based on the position of the X-ray detector 2 when the X-ray detector 2 is brought into contact portion with the subject 80 and generate the subject model 90 based on the acquired body thickness 80a and body width 80b of the subject 80.

Further, the model generation unit 16a may be configured to generate the subject model 90 based on the body thickness level and the body width level of the subject 80 input by the input reception unit 8. The body thickness levels of the subject 80 include, for example, three levels of "large," "medium," and "small." The operator selects the body thickness level of the subject 80 based on visual information, information on the height and the weight of the subject 80, or the like. Further, the body thickness levels of the subject 80 include, for example, three levels of "large," "medium," and "small." The operator selects the body thickness level of the subject 80 based on visual inspection or information on the height and the weight of the subject 80. Further, the model generation unit 16a may be configured to generate the subject model 90 based on the body thickness level and the body width level of the subject selected by the operator.

Further, the model generation unit 16a may be configured to set the imaging conditions based on the X-ray dose detected by the X-ray detector 2 and acquire the body thickness 80a and the body width 80b of the subject 80 based on the set imaging conditions. In other words, the model generation unit 16a may be configured to generate the subject model 90 based on the body thickness 80a and the body width 80b of the subject 80 which were acquired based on the imaging conditions. The imaging conditions include the magnitude of the tube voltage and the tube current applied to the X-ray source 1.

Further, the above-described configuration example is shown in which the model generation unit 16a generates the subject model 90 based on the physique information 73 on the subject 80 acquired by the non-contact sensor 15, but the present invention is not limited thereto.

For example, the model generation unit 16a may be configured to be able to generate the subject model 90 by the method selected by the operation, out of the method of generating the subject model 90 based on the physique information 73 on the subject 80 acquired by the non-contact sensor 15, the method of generating the subject model 90 based on the position of the X-ray detector 2 when the X-ray detector 2 is brought into contact with the subject 80, the method of generating the subject model 90 based on the body thickness level and the body width level of the subject 80 selected by the operator, and the method of generating the subject model 90 based on the body thickness 80a and the body width 80b of the subject 80 acquired based on the imaging conditions. Further, the model generation unit 16a may be configured to be able to generate the subject model 90 by combining the methods.

Further, the above-described configuration example is shown in which the model generation unit 16a generates the subject model 90 based on the physique information 73 on the subject 80 acquired by the non-contact sensor 15, but the present invention is not limited thereto. For example, the model generation unit 16a may be configured to generate the subject model 90 with a predetermined thickness 90a and width 90b.

Further, in the above-described embodiment, a configuration example is shown in which the X-ray imaging apparatus 100 is equipped with the contact sensor 10, but the present invention is not limited thereto. For example, the X-ray imaging apparatus 100 may not be equipped with the contact sensor 10. In the case where the X-ray imaging apparatus 100 is not equipped with the contact sensor 10, it may be equipped with a distance sensor instead of the contact sensor 10. The controller 7 may determine whether or not the X-ray detector 2 has come into contact portion with the subject 80 by means of a distance sensor.

Further, in this embodiment, a configuration example is shown in which the controller 7 acquires the first target position 20 in the arm angle information 71 on the preset information 70 selected by the operator and also acquires the detector position information 72 included in the preset information 70 as the second target position 21, but the present invention is not limited thereto. For example, the controller 7 may be configured to acquire, as the second target position 21, the first target position 20 on the arm angle information 71 input by the operator and the detector position information 72 input by the operator.

Further, in the above-described embodiment, a configuration example is shown in which the controller 7 changes the arm 3 to the first imaging position and the second imaging position and performs the control to image the subject 80 in each imaging position, but the present invention is not limited thereto. For example, the controller 7 may perform the control to move the arm 3 to an imaging position other than the first imaging position and the second imaging position to image the subject 80. The imaging position may be set at any desired position.

Further, although a configuration example is shown in which the controller 7 in this embodiment changes the imaging position by performing the control to move the arm 3, the present invention is not limited thereto. For example, the controller 7 may be configured to change the imaging position by controlling the bed 11 without moving the arm 3. Further, the controller 7 may be configured to change the imaging position by controlling the movement of both the arm 3 and the bed 11.

Further, in this embodiment, the above-described configuration example is shown in which the controller 7 performs the position adjuster operation by moving the X-ray detector 2 backward by the X-ray detector moving mechanism 5 in advance and moving the X-ray detector 2 forward by the X-ray detector moving mechanism 5 after changing the imaging position, but the present invention is not limited thereto. For example, the controller 7 may be configured to perform the position adjuster operation by moving the X-ray detector 2 backward while changing at least one of the positions and the angles of the arm 3 and by moving the X-ray detector 2 forward while changing at least one of the positions and the angles of the arm 3.

Further, in the above-described embodiment, a configuration example is shown in which the controller 7 decreases the moving speed of the arm 3 at a limited rate when decreasing the moving speed of the arm 3, but the present invention is not limited thereto. For example, the controller 7 may be configured to decrease the moving speed of the arm 3 by decreasing the maximum moving speed of the arm 3.

Further, in this embodiment, the configuration example is shown in which the controller 7 reduces the moving speed of the arm 3 by uniformly reducing the moving speed of the arm 3, which is changed according to the tilt amount of the joystick, but the present invention is not limited thereto. For example, the controller 7 may be configured to decrease the moving speed of the arm 3 by decreasing the maximum moving speed of the arm 3.

Further, in the above-described embodiment, a configuration example is shown in which the controller 7 does not perform the control to decrease the moving speed of the arm 3 again after once decreasing the moving speed of the arm 3, but the present invention is not limited thereto. For example, the controller 7 may be configured to decrease the moving speed of the arm 3 after decreasing the moving speed of the arm 3. For example, the controller 7 may be configured to gradually decrease the moving speed of the arm 3 as the X-ray detector 2 when moving the arm 3 approaches the subject model 90.

Further, in the above-described embodiment, a configuration example in which the subject model 90 has an oval shape is shown, but the present invention is limited thereto. The subject model 90 may have, for example, a rectangular shape. Further, the subject model 90 may have, for example, a rectangular shape.

Further, in the above-described embodiment, a configuration example is shown in which the model update unit 7b updates both the thickness 90a and the width 90b of the subject model 90, but the present invention is not limited thereto. For example, the model update unit 7b may be configured to update either the thickness 90a or the width 90b of the subject model 90. In this case, when the angle of the arm 3 is equal to or less than a predetermined angle, the model update unit 7b may be configured to update the thickness 90a of the subject model 90. Further, when the angle of the arm 3 is greater than the predetermined angle, the model update unit 7b may be configured to update the width 90b of the subject model 90.

Further, in the first modification and the third modification described above, an example is shown in which a so-called biplane X-ray imaging apparatus is equipped with the first X-ray source 201, the first X-ray detector 202, and the first arm 203, and the second X-ray source 209, the second X-ray detector 210, and the second arm 211, but the present invention is not limited thereto. For example, the combined number of the X-ray source, the X-ray detector, and the arm combinations may be three or more.

[Aspects]

It would be understood by those skilled in the art that the exemplary embodiments described above are specific examples of the following aspects.

(Item 1)

An X-ray imaging apparatus comprising:
- an X-ray source configured to irradiate a subject with X-rays;
- an X-ray detector configured to detect X-rays emitted from the X-ray source;
- an arm configured to hold the X-ray source and the X-ray detector;
- an arm driving mechanism configured to drive the arm;
- an X-ray detector moving mechanism provided on the arm to move the X-ray detector forward or backward in an X-ray irradiation axis direction;
- a model acquisition unit configured to acquire a subject model, the subsect model being a model of a surface shape of the subject; and
- a controller configured to perform a control to move the X-ray detector toward a selected target position by selecting a target position where a distance of the X-ray detector to a surface of the subject model is shorter, out of a first target position and a second target position, the first target position being a target position of the X-ray detector set based on a position of the subject model, the second target position being a preset target position of the X-ray detector, and controlling the X-ray detector moving mechanism.

(Item 2)

The X-ray imaging apparatus as recited in the above-described Item 1, further comprising:
- a distance acquisition unit configured to acquire a first distance and a second distance, the first distance being a distance between the first target position and the surface of the subject model, the second distance being a distance between the second target position and the surface of the subject model,
- wherein the controller is configured to
- compare the first distance and the second distance, the first distance and the second distance being acquired by the distance acquisition unit, and
- control the X-ray detector moving mechanism such that the X-ray detector is moved toward the first target position when the first distance is shorter than the second distance and that the X-ray detector is moved toward the second target position when the second distance is shorter than the first distance.

(Item 3)

The X-ray imaging apparatus as recited in the above-described Item 1 or 2, further comprising:
- an input reception unit configured to receive an operation input of an operator,
- wherein the controller is configured to compare the first target position and the second target position, the second target position being set based on an operator input of the operator.

(Item 4)

The X-ray imaging apparatus as recited in the above-described Item 3, further comprising:
- a storage unit configured to store the subject model; and
- a model update unit configured to update the subject model stored in the storage unit, based on a relative position of the subject model and the X-ray detector after moving the X-ray detector to a selected target position out of the first target position and the second target position,
- wherein the controller is configured to update the first target position based on the updated subject model when changing an angle of the arm.

(Item 5)

The X-ray imaging apparatus as recited in the above-described Item 4,
- wherein the controller is configured to select the target position where the distance of the X-ray detector to the surface of the subject model is shorter out of the updated first target position and the second target position corresponding to a changed angle of the arm, when changing the angle of the arm.

(Item 6)

The X-ray imaging apparatus as recited in the above-described Item 4 or 5,
- wherein the model update unit is configured to update the subject model in a case where the X-ray detector is placed inside the subject model.

(Item 7)

The X-ray imaging apparatus as recited in the above-described Item 4 or 5, further comprising:
- a contact sensor provided on the X-ray detector moving mechanism to detect whether the X-ray detector and the subject come into contact with each other,
- wherein the model update unit is configured to update the subject model based on a position of the X-ray detector when a contact between the X-ray detector and the subject is no longer detected by the contact sensor after the contact between the X-ray detector and the subject is detected by the contact sensor.

(Item 8)

The X-ray imaging apparatus as recited in any one of the above-described Items 4 to 7,
- wherein the storage unit is configured to store a plurality of pieces of preset information including arm angle information and detector position information, the arm angle information being information on an angle of the arm at the target position, the detector position information being information on a position of the X-ray detector in the X-ray irradiation axis direction, and
- wherein when any one of the plurality of pieces of preset information is selected based on the operation input of the operator input by the input reception unit,
- the controller is configured to
- acquire the first target position in the arm angle information of the selected preset information,
- acquire, as the second target position, the detector position information included in the selected preset information, and
- compare the acquired first target position and the acquired second target position.

(Item 9)

The X-ray imaging apparatus as recited in any one of the above-described Items 1 to 8, further comprising:
- a bed configured to place the subject thereon;
- a non-contact sensor configured to acquire physique information, the physique information being information on a physique of the subject placed on the bed; and
- a model generation unit configured to generate the subject model based on the information on the subject, the information being acquired by the non-contact sensor.

(Item 10)

The X-ray imaging apparatus as recited in any one of the above-described Items 1 to 9,
- wherein the X-ray source includes a first X-ray source and a second X-ray source,
- wherein the X-ray detector includes a first X-ray detector for detecting X-rays emitted from the first X-ray source and a second X-ray detector for detecting X-rays emitted from the second X-ray source,
- wherein the arm includes a first arm for holding the first X-ray source and the first X-ray detector and a second arm for holding the second X-ray source and the second X-ray detector,
- wherein the arm driving mechanism includes a first arm driving mechanism for driving the first arm and a second arm driving mechanism for driving the second arm,
- wherein the X-ray detector moving mechanism includes a first X-ray detector moving mechanism for moving the first X-ray detector forward or backward in the X-ray irradiation axis direction and a second X-ray detector moving mechanism for moving the second X-ray detector backward or forward in the X-ray irradiation axis direction, and
- wherein the controller is configured to
- perform a control to move the first X-ray detector toward the selected target position by selecting a target position where a distance of the first X-ray detector to the surface of the subject model is shorter out of the first target position and the second target position, and perform a control to move the second X-ray detector toward the elected target position by selecting a target position where a distance of the second X-ray detector to the surface of the subject model is shorter out of a third target position which is a target position of the second X-ray detector set based on a position of the subject model and a fourth target position which is a preset target position of the second X-ray detector.

(Item 11)

The X-ray imaging apparatus as recited in any one the above-described Items 1 to 9,
wherein the X-ray source includes a first X-ray source and a second X-ray source,
wherein the X-ray detector includes a first X-ray detector for detecting X-rays emitted from the first X-ray source and a second X-ray detector for detecting X-rays emitted from the second X-ray source,
wherein the arm includes a first arm for holding the first X-ray source and the first X-ray detector and a second arm for holding the second X-ray source and the second X-ray detector,
wherein the arm driving mechanism includes a first arm driving mechanism for driving the first arm and a second arm driving mechanism for driving the second arm,
wherein the X-ray detector moving mechanism includes a first X-ray detector moving mechanism for moving the first X-ray detector forward or backward in the X-ray irradiation axis direction and a second X-ray detector moving mechanism for moving the second X-ray detector forward or backward in the X-ray irradiation axis direction, and
wherein in a case of performing X-ray imaging by the first X-ray source and the first X-ray detector and not performing X-ray imaging by the second X-ray source and the second X-ray detector,
the controller is configured to
perform a control to move the first X-ray detector toward the selected target position by comparing the first target position and the second target position in moving the first X-ray detector, selecting a target position where a distance of the first X-ray detector to the surface of the subject model is shorter out of the first target position and the second target position, and controlling the first X-ray detector moving mechanism, and
perform a control to move the second X-ray detector toward the fourth target position by controlling the second X-ray detector moving mechanism without comparing a third target position which is a target position of the second X-ray detector set based on the position of the subject model and a fourth target position which is a preset target position of the second X-ray detector in moving the second X-ray detector.

(Item 12)

The X-ray imaging apparatus as recited in the above-described Item 10 or 11, further comprising:
an input reception unit configured to receive an operation input of an operator regarding a first imaging setting and a second imaging setting, the first imaging setting being a setting of whether to perform X-ray imaging by the first X-ray source and the first X-ray detector, the second imaging setting being a setting of whether to perform X-ray imaging by the second X-ray source and the second X-ray detector,
wherein the controller is configured to move the first X-ray detector and the second X-ray detector based on the first imaging setting or the second imaging setting, the first imaging setting and the second imaging setting being set by the operation input of the operator to the input reception unit.

(Item 13)

The X-ray imaging apparatus as recited in the above-described Item 11, further comprising:
an input reception unit configured to receive an operation input of an operator; and
a storage unit configured to store a first imaging setting, a second imaging setting, and a plurality of pieces of preset information, the first imaging setting being a setting of whether to perform X-ray imaging by the first X-ray source and the first X-ray detector, the second imaging setting being a setting of whether to perform X-ray imaging by the second X-ray source and the second X-ray detector, the plurality of pieces of preset information including first detector position information which is information on a position of the first X-ray detector in the X-ray irradiation axis direction and second detector position information which is information on a position of the second X-ray detector in the X-ray irradiation axis direction,
wherein the controller is configured to acquire, as the fourth target position, the second detector position information included in the selected preset information in a case where any one of the plurality of pieces of preset information is selected based on the operation input of the operator input by the input reception unit and it is set in the second imaging setting not to perform X-ray imaging by the second X-ray source and the second X-ray detector.

The invention claimed is:

1. An X-ray imaging apparatus comprising:
an X-ray source configured to irradiate a subject with X-rays;
an X-ray detector configured to detect X-rays emitted from the X-ray source;
an arm configured to hold the X-ray source and the X-ray detector;
an arm driving mechanism configured to drive the arm;
an X-ray detector moving mechanism provided on the arm to move the X-ray detector forward or backward in an X-ray irradiation axis direction;
a model acquisition unit configured to acquire a subject model, the subject model being a model of a surface shape of the subject; and
a controller configured to perform a control to move the X-ray detector toward a selected target position by selecting a target position of shorter distance of the X-ray detector to a surface of the subject model, out of a first distance being a distance between the X-ray detector of a first target position and the surface of the subject model and a second distance being a distance between the X-ray detector of a second target position and the surface of the subject model, and controlling the X-ray detector moving mechanism, the first target position being a target position of the X-ray detector set based on a position of the subject model, and the second target position being a preset target position of the X-ray detector.

2. The X-ray imaging apparatus as recited in claim 1, further comprising:
a distance acquisition unit configured to acquire the first distance and the second distance,
wherein the controller is configured to:
compare the first distance and the second distance, the first distance and the second distance being acquired by the distance acquisition unit, and
control the X-ray detector moving mechanism such that the X-ray detector is moved toward the first target position when the first distance is shorter than the second distance and that the X-ray detector is moved toward the second target position when the second distance is shorter than the first distance.

3. The X-ray imaging apparatus as recited in claim 2, further comprising:
an input reception unit configured to receive an operation input of an operator,
wherein the controller is configured to compare the first target position and the second target position, the second target position being set based on an operator input of the operator.

4. The X-ray imaging apparatus as recited in claim 3, further comprising:
a storage unit configured to store the subject model; and
a model update unit configured to update the subject model stored in the storage unit, based on a relative position of the subject model and the X-ray detector after moving the X-ray detector to the selected target position out of the first target position and the second target position,
wherein the controller is configured to update the first target position based on the updated subject model when changing an angle of the arm.

5. The X-ray imaging apparatus as recited in claim 4,
wherein the controller is configured to select the target position where the distance of the X-ray detector to the surface of the subject model is shorter out of the updated first target position and the second target position corresponding to a changed angle of the arm, when changing the angle of the arm.

6. The X-ray imaging apparatus as recited in claim 4,
wherein the model update unit is configured to update the subject model in a case where the X-ray detector is placed inside the subject model.

7. The X-ray imaging apparatus as recited in claim 4, further comprising:
a contact sensor provided on the X-ray detector moving mechanism to detect whether the X-ray detector and the subject come into contact with each other,
wherein the model update unit is configured to update the subject model based on a position of the X-ray detector when a contact between the X-ray detector and the subject is no longer detected by the contact sensor after the contact between the X-ray detector and the subject is detected by the contact sensor.

8. The X-ray imaging apparatus as recited in claim 4,
wherein the storage unit is configured to store a plurality of pieces of preset information including arm angle information and detector position information, the arm angle information being information on an angle of the arm at the target position, the detector position information being information on a position of the X-ray detector in the X-ray irradiation axis direction,
wherein when any one of the plurality of pieces of preset information is selected based on the operation input of the operator input by the input reception unit,
the controller is configured to
acquire the first target position in the arm angle information of the selected preset information,
acquire, as the second target position, the detector position information included in the selected preset information, and
compare the acquired first target position and the acquired second target position.

9. The X-ray imaging apparatus as recited in claim 1, further comprising:
a bed configured to place the subject thereon;
a non-contact sensor configured to acquire physique information, the physique information being information on a physique of the subject placed on the bed; and
a model generation unit configured to generate the subject model based on the information on the subject, the information being acquired by the non-contact sensor.

10. The X-ray imaging apparatus as recited in claim 1,
wherein the X-ray source includes a first X-ray source and a second X-ray source,
wherein the X-ray detector includes a first X-ray detector for detecting X-rays emitted from the first X-ray source and a second X-ray detector for detecting X-rays emitted from the second X-ray source,
wherein the arm includes a first arm for holding the first X-ray source and the first X-ray detector and a second arm for holding the second X-ray source and the second X-ray detector,
wherein the arm driving mechanism includes a first arm driving mechanism for driving the first arm and a second arm driving mechanism for driving the second arm,
wherein the X-ray detector moving mechanism includes a first X-ray detector moving mechanism for moving the first X-ray detector forward or backward in the X-ray irradiation axis direction and a second X-ray detector moving mechanism for moving the second X-ray detector backward or forward in the X-ray irradiation axis direction, and
wherein the controller is configured to
perform a control to move the first X-ray detector toward the selected target position by selecting a target position where a distance of the first X-ray detector to the surface of the subject model is shorter out of the first target position and the second target position, and
perform a control to move the second X-ray detector toward the elected target position by selecting a target position where a distance of the second X-ray detector to the surface of the subject model is shorter out of a third target position which is a target position of the second X-ray detector set based on a position of the subject model and a fourth target position which is a preset target position of the second X-ray detector.

11. The X-ray imaging apparatus as recited in claim 1,
wherein the X-ray source includes a first X-ray source and a second X-ray source,
wherein the X-ray detector includes a first X-ray detector for detecting X-rays emitted from the first X-ray source and a second X-ray detector for detecting X-rays emitted from the second X-ray source,
wherein the arm includes a first arm for holding the first X-ray source and the first X-ray detector and a second arm for holding the second X-ray source and the second X-ray detector, wherein the arm driving mechanism includes a first arm driving mechanism for driving the first arm and a second arm driving mechanism for driving the second arm, wherein the X-ray detector moving mechanism includes a first X-ray detector moving mechanism for moving the first X-ray detector forward or backward in the X-ray irradiation axis direction and a second X-ray detector moving mechanism for moving the second X-ray detector forward or backward in the X-ray irradiation axis direction, and wherein in a case of performing X-ray imaging by the first X-ray source and the first X-ray detector and not performing X-ray imaging by the second X-ray source and the second X-ray detector, the controller is configured to perform a control to move the first X-ray detector toward the selected target position by comparing the first target position and the second target position in moving the first X-ray detector, selecting a target position where a distance of the first X-ray detector to the surface of the subject model is shorter out of the first target position and the second target position, and controlling the first X-ray detector moving mechanism, and perform a control to move the second X-ray detector toward a fourth target position by controlling the second X-ray detector moving mechanism without comparing a third target position which is a target position of the second X-ray detector set based on the position of the subject model and the fourth target position which is a preset target position of the second X-ray detector in moving the second X-ray detector.

12. The X-ray imaging apparatus as recited in claim 10, further comprising:

an input reception unit configured to receive an operation input of an operator regarding a first imaging setting and a second imaging setting, the first imaging setting being a setting of whether to perform X-ray imaging by the first X-ray source and the first X-ray detector, the second imaging setting being a setting of whether to perform X-ray imaging by the second X-ray source and the second X-ray detector, wherein the controller is configured to move the first X-ray detector and the second X-ray detector based on the first imaging setting or the second imaging setting, the first imaging setting and the second imaging setting being set by the operation input of the operator to the input reception unit.

13. The X-ray imaging apparatus as recited in claim 11, further comprising:

an input reception unit configured to receive an operation input of an operator; and a storage unit configured to store a first imaging setting, a second imaging setting, and a plurality of pieces of preset information, the first imaging setting being a setting of whether to perform X-ray imaging by the first X-ray source and the first X-ray detector, the second imaging setting being a setting of whether to perform X-ray imaging by the second X-ray source and the second X-ray detector, the plurality of pieces of preset information including first detector position information which is information on a position of the first X-ray detector in the X-ray irradiation axis direction and second detector position information which is information on a position of the second X-ray detector in the X-ray irradiation axis direction, wherein the controller is configured to acquire, as the fourth target position, the second detector position information included in the selected preset information in a case where any one of the plurality of pieces of preset information is selected based on the operation input of the operator input by the input reception unit and it is set in the second imaging setting not to perform X-ray imaging by the second X-ray source and the second X-ray detector.

* * * * *